(12) United States Patent
Ogawa

(10) Patent No.: US 9,558,412 B2
(45) Date of Patent: Jan. 31, 2017

(54) VEHICLE EXTERIOR ENVIRONMENT RECOGNITION DEVICE

(71) Applicant: FUJI JUKOGYO KABUSHIKI KAISHA, Tokyo (JP)

(72) Inventor: Genya Ogawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 14/668,219

(22) Filed: Mar. 25, 2015

(65) Prior Publication Data

US 2015/0278615 A1    Oct. 1, 2015

(30) Foreign Application Priority Data

Mar. 28, 2014 (JP) ................ 2014-070487

(51) Int. Cl.
  *H04N 7/18* (2006.01)
  *G06K 9/00* (2006.01)
  *H04N 5/232* (2006.01)
  *G06K 9/46* (2006.01)
(52) U.S. Cl.
  CPC ......... *G06K 9/00818* (2013.01); *G06K 9/4633* (2013.01); *H04N 5/23229* (2013.01); *H04N 7/183* (2013.01)
(58) Field of Classification Search
  CPC .............................................. G06K 9/00818
  See application file for complete search history.

(56) References Cited

U.S. PATENT DOCUMENTS

| | | | |
|---|---|---|---|
| 9,436,879 B2 * | 9/2016 | Zobel | G06K 9/00818 |
| 2005/0086051 A1 * | 4/2005 | Brulle-Drews | G01C 21/3602 704/7 |
| 2008/0002891 A1 * | 1/2008 | Shibata | G06K 9/00818 382/209 |
| 2009/0172527 A1 * | 7/2009 | Buecker | G08G 1/096716 715/700 |
| 2010/0067805 A1 * | 3/2010 | Klefenz | G06K 9/4633 382/201 |
| 2010/0283855 A1 | 11/2010 | Becker | |

(Continued)

FOREIGN PATENT DOCUMENTS

| | | |
|---|---|---|
| JP | 3349060 A | 11/2002 |
| JP | 2012-243051 A | 12/2012 |
| JP | 2013-109391 A | 6/2013 |

*Primary Examiner* — Tracy Y Li

(74) *Attorney, Agent, or Firm* — McDermott Will & Emery LLP

(57) ABSTRACT

A vehicle exterior environment recognition device includes an image acquiring module that acquires an image, a traffic sign identifying module that identifies a circle of a predetermined radius centering on any one of pixels in the image as a traffic sign, a traffic sign content recognizing module that recognizes content of the identified traffic sign, and a traffic sign content determining module that uses at least one template for one certain country to integrate traffic sign integration points based on correlation evaluation values with the content of the recognized traffic sign, uses a template for each of a plurality of countries corresponding to the content of the traffic sign having the traffic sign integration points to integrate total points by country based on overall evaluation values of the content of the recognized traffic sign, and conclusively determines a currently-traveling country.

4 Claims, 29 Drawing Sheets

(56) References Cited

U.S. PATENT DOCUMENTS

2013/0201334 A1* 8/2013 C ........................ G06K 9/00818
                                                          348/148
2015/0220795 A1* 8/2015 Fischer ................. G01S 13/931
                                                          348/148

* cited by examiner

CENTER POINT
CANDIDATE LIST   310

| SCREEN POSITION |
|---|
| (200, 120) |
| (220, 130) |
| (340, 170) |
| (300, 165) |
| (214, 150) |
| ⋮ |

FIG. 14

| SPEED (km/h) | 10 | 20 | 30 | ... | 150 |
|---|---|---|---|---|---|
| COUNTRY A | 10 | 20 | 30 | ... | 150 |
| COUNTRY B | 10 | 20 | 30 | ... | 150 |
| ⋮ | ⋮ | ⋮ | ⋮ | ⋮ | ⋮ |
| COUNTRY Z | 10 | 20 | 30 | ... | 150 |

FIG. 29

VEHICLE EXTERIOR ENVIRONMENT RECOGNITION DEVICE

CROSS-REFERENCE TO RELATED APPLICATION

The present application claims priority from Japanese Patent Application No. 2014-070487 filed on Mar. 28, 2014, the entire content of which are hereby incorporated by reference.

BACKGROUND

1. Technical Field

The present disclosure relates to a vehicle exterior environment recognition device that recognizes content of a traffic sign that is confirmed outside a vehicle.

2. Related Art

Conventionally, there are techniques to detect a particular object, such as another vehicle located ahead of a vehicle (for example, see Japanese Patent No. 3349060B). Such a technique is used to avoid a collision with a leading vehicle (collision avoidance control), or to control a distance between the two vehicles to be maintained at a safe distance (cruise control). In order to reduce accidents resulting from speeding, demands for techniques to recognize a speed limit provided for each road and control the speed of the vehicle is increasing.

In order to safely travel the vehicle within a speed limit, it is necessary to recognize content of a traffic sign located at a road shoulder or a gate, and to correctly grasp the speed limit of the currently traveling road. For example, Japanese Unexamined Patent Application Publication (JP-A) No. 2012-243051 discloses a technique to apply Hough transform to part corresponding to an edge on a screen image, and recognize an image of a circular traffic sign (hereinafter, an image of the traffic sign is also simply referred to as "the traffic sign"). In this technique, a processing load required for the Hough transform is reduced, whereby the efficiency of identifying the traffic sign can be improved.

In order to perform the Hough transform and to recognize the circular traffic sign, a feature point corresponding to part of the circumference of the circular traffic sign is first identified, points on the circumference that are separated from the feature point by a predetermined distance are voted, and a candidate of the traffic sign having a center position and a radius of the circle is identified according to the number of votes obtained. Then, the content of the traffic sign is recognized by applying, for example, pattern matching, to the candidate of the traffic sign. However, the traffic signs that present a speed limit may be different in the size and/or the shape of numerals indicating the speed limits, and/or in the distance between the numerals, in each country. Therefore, if the pattern matching is simply performed disregarding the differences, the matching may be established for the content that should not be originally matched, whereby troubles may be caused in the safe traveling.

SUMMARY OF THE INVENTION

The present disclosure is made in view of the above situations, and a purpose of the present disclosure is to provide a vehicle exterior environment recognition device that can improve identification accuracy of content of a traffic sign by appropriately determining a currently-traveling country, while reducing a processing load.

An aspect of the present disclosure provides a vehicle exterior environment recognition device including: an image acquiring module that acquires an image; a traffic sign identifying module that identifies a circle of a predetermined radius centering on any one of pixels in the image as a traffic sign; a traffic sign content recognizing module that recognizes content of the identified traffic sign; and a traffic sign content determining module that uses at least one template for one certain country to integrate traffic sign integration points based on correlation evaluation values with the recognized content of the identified traffic sign, uses a template for each of a plurality of countries corresponding to the content of the traffic sign having the traffic sign integration points to integrate total points by country based on overall evaluation values of the content of the recognized traffic sign, and conclusively determines a currently-traveling country.

The traffic sign content determining module may apply weighting to the overall evaluation values a currently-recognized country and a country adjacent to the currently-recognized country so that the currently-recognized country and the country adjacent to the currently-recognized country are easily selected.

The traffic sign content determining module may store images of traffic signs having the traffic sign integration points in an image memory, integrate the total points by country based on correlation evaluation values of the content of the recognized traffic sign, and execute the processing that conclusively determines the currently-traveling country, during an idle time of the processing that integrates the traffic sign integration points based on the correlation evaluation values of the content of the recognized traffic sign using the at least one template of the one certain country.

BRIEF DESCRIPTION OF THE DRAWINGS

The present disclosure is illustrated by way of example and not by way of limitation in the figures of the accompanying drawings, in which the like reference numerals indicate like elements and in which:

FIG. 14 is a diagram illustrating a center point candidate list;

FIG. 29 is a table illustrating templates of the traffic signs.

DETAILED DESCRIPTION

Figure 1:
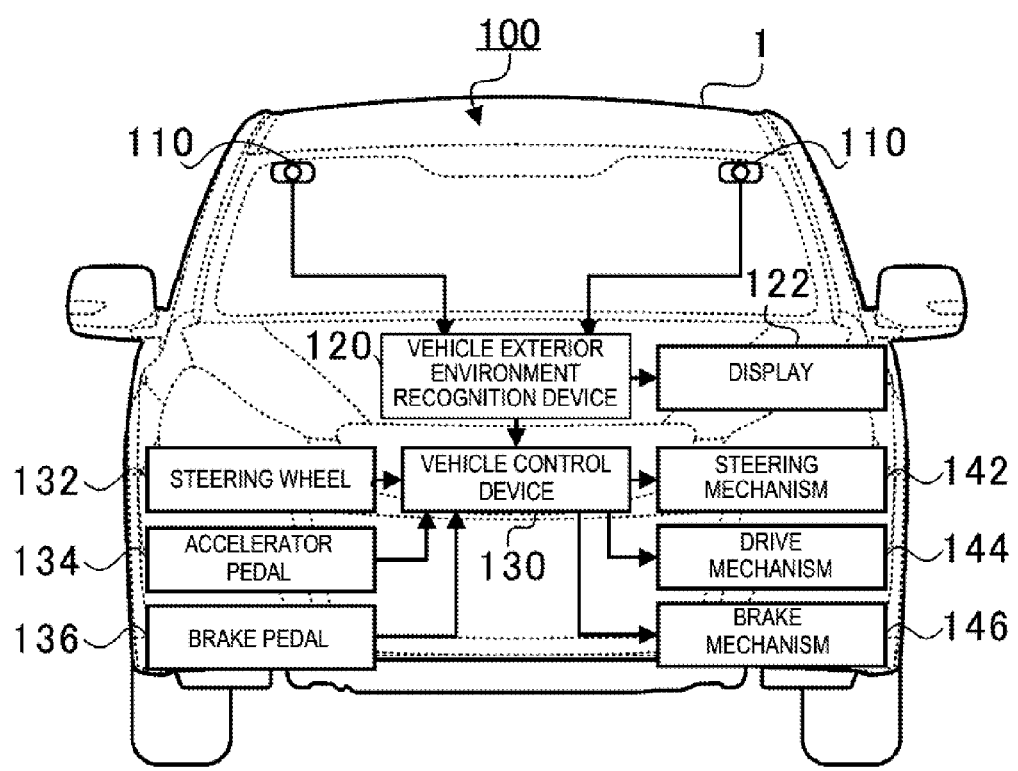
FIG. 1 is a block diagram illustrating a connecting relation of a vehicle exterior environment recognition system.

Hereinafter, suitable examples of the present disclosure will be described in detail with reference to the accompanying drawings. Note that dimensions, materials, particular numerical values, etc. illustrated in the examples are merely illustrations for easier understanding of the present disclosure and, thus, they are not to limit the present disclosure unless otherwise particularly specified. Further, in this description and the drawings, elements having substantially the same functions and configurations are denoted with the same reference numerals for eliminating redundant explanations. Moreover, illustrations of elements that are not directly related to the present disclosure are omitted herein.

Vehicle Exterior Environment Recognition System 100

FIG. 1 is a block diagram illustrating a connecting relation of a vehicle exterior environment recognition system 100. The vehicle exterior environment recognition system 100 includes imaging devices 110, a vehicle exterior environment recognition device 120, and a vehicle control device 130 (e.g., an ECU or Engine Control Unit), which are provided inside a vehicle 1. Note that, the vehicle 1 is simply referred to as "the vehicle" or "the vehicle 1" herein for the purpose of discriminating from other vehicles.

Each imaging device 110 is comprised of imaging elements, such as CCDs (Charge-Coupled Devices) and CMOSs (Complementary Metal-Oxide Semiconductors). The imaging device 110 can image an environment corresponding to an area ahead of the vehicle 1 to generate a color image that can be expressed by color values. Here, the color value is a numerical group that is expressed by either of one of a YUV color space consisting of one luminance (Y) and two color differences (U and V), an RGB color space consisting of three hues (R (Red), G (Green), and B (Blue)), or an HSB color space consisting of the hues (H), chroma (S), and brightness (B). In this example, a color image expressed by the color values of the YUV form will be described as an example image; however, a luminance image (monochrome image) that can be expressed by the luminance (Y) can also be used in addition to the color image for applications in which any partial processing can be carried out without depending on the color image.

Moreover, the pair of imaging devices 110 is disposed so as to be separated from each other in a substantially horizontal direction. The imaging devices 110 are oriented in a traveling direction of the vehicle 1, and optical axes thereof are substantially parallel to each other. Each imaging device 110 sequentially generates a color image that is obtained by imaging objects existing within a detection area ahead of the vehicle 1 frame by frame, for example, at the rate of 1/60 seconds (i.e., 60 fps). In this example, the objects to be recognized not only include solid objects that exist independently, such as vehicles, pedestrians, traffic signals, roads (traveling path), traffic signs, gates, guardrails, and buildings, but also include objects that can be identified as part of the solid object, such as content of the traffic sign, a brake lamp, a high-mounted stop lamp, a taillight, a blinker, and each illuminating part of the traffic signal. Each functional module in the following examples carries out respective processing for each frame, triggered by a refresh of such a color image.

Further, in this example, each imaging device 110 images the detection area in a first exposure mode where an exposure time and an aperture stop according to brightness of the vehicle exterior environment (e.g., measurements of an illuminometer) are defined and generates a first image. Each imaging device 110 also generates an image from which a particular light source (e.g., a traffic sign of an electric light display type) self-emits light can be determined. The method therefor includes using imaging elements having a large dynamic range and imaging so that black defects are not caused to objects that do not emit light, and halation is not caused to light sources, or imaging one detection area in a second exposure mode that is different in the exposure mode (i.e., the exposure time and the aperture stop) from the first exposure mode to generate a second image. For example, if it is daytime, the second image is generated with a shorter exposure time of the second exposure mode than the exposure time of the first exposure mode that is determined according to the bright vehicle exterior environment, or with a smaller aperture. In this example, the first image and the second image are used as a color image and a distance image, respectively. Further, the first exposure mode and the second exposure mode are achieved as follows.

For example, the first image and the second image can be sequentially generated by dividing the periodic imaging timing of the imaging device 110, and alternately imaging in the first exposure mode and the second exposure mode. Alternatively, two capacitors are provided for every pixel, and the imaging elements that can charge the two capacitors in parallel are provided. The time periods for charging the capacitors by one exposure are differentiated to parallelly generate two images that are different in the exposure mode. Alternatively, the same purpose can be achieved by reading twice at different timings during a charge of one capacitor, and parallelly generating two images that are different in the exposure mode. Alternatively, two sets of imaging devices 110 that are different in the exposure mode may be prepared in advance (here, two sets of two imaging devices 110), and the two sets of the imaging devices 110 may generate an image, respectively.

The vehicle exterior environment recognition device 120 acquires a color image from each of the two imaging devices 110. The vehicle exterior environment recognition device 120 uses so-called pattern matching in which one block (e.g., a matrix of 4 pixels in horizontal directions×4 pixels in vertical directions) extracted from one of the color images, and a block corresponding to the block in the first color image is searched in the second color image, to derive parallax information that includes parallax and a screen position indicative of the position of the block in question in the screen image. Note that the horizontal directions indicate screen transverse or lateral directions of the captured image, and the vertical directions indicate screen vertical directions of the captured image. The pattern matching includes comparing a pair of images in the luminance (Y) block by block. For example, the pattern matching includes SAD (Sum of Absolute Difference) in which a difference of the luminance is obtained, SSD (Sum of Squared intensity Difference) in which the difference is squared before used, and NCC (Normalized Cross Correlation) in which an average vale of luminances of pixels is calculated, and a variance is obtained by subtracting the average value from the luminance of each pixel to find the similarity. The vehicle exterior environment recognition device 120 performs such parallax derivation processing block by block for all the blocks that are displayed within the detection area (e.g., 600 pixels×200 pixels). Here, the block is comprised of 4 pixels×4 pixels; however, the number of pixels within one block can be suitably selected.

Note that, although the vehicle exterior environment recognition device 120 can derive the parallax for every block that is a unit of detection resolution, it cannot recognize what kind of object the block is involved. Therefore, the parallax information is independently derived not object by object unit but by detection resolution by detection resolution (e.g., block by block) in the detection area. Here, the image associated with the parallax information thus derived is referred to as the distance image, in order to distinguish from the color image described above.

Figure 2A:
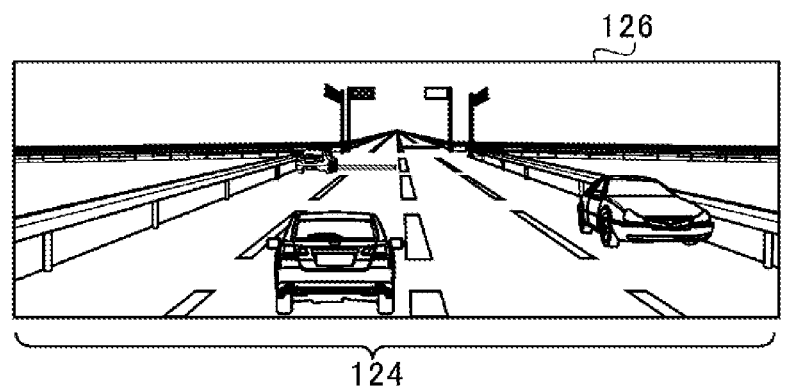
FIGS. 2A and 2B are diagrams illustrating a color image and a distance image, respectively.
Figure 2B:
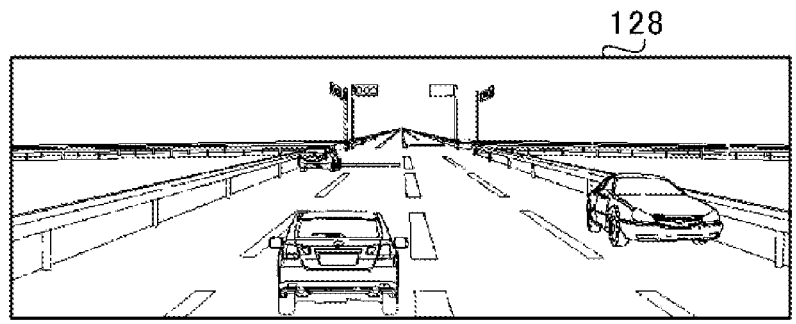

FIGS. 2A and 2B are diagram illustrating a color image 126 and a distance image 128, respectively. For example, suppose that the two imaging devices 110 generate the color image 126 corresponding to the detection area 124 as illustrated in FIG. 2A. Note that only one of the two color images 126 is schematically illustrated here in order to facilitate understandings. The vehicle exterior environment recognition device 120 obtains the parallax for every block from such a color image 126, and forms the distance image 128 as illustrated in FIG. 2B. Each block in the distance image 128 is associated with the parallax of the block. Here, the block of which the parallax is derived is expressed by a black dot for convenience of explanation. In this example, the color image 126 and the distance image 128 are generated based on the first image and the second image, respectively.

Further, the vehicle exterior environment recognition device 120 uses the color values based on the color image 126, and three-dimensional positional information in the real space including a relative distance with the vehicle 1 that is calculated based on the distance image 128 to group the blocks that are equal in the color values and are close at the three-dimensional positional information as an object. The vehicle exterior environment recognition device 120 then identifies to which particular object (e.g., a leading vehicle) the object in the detection area ahead of the vehicle 1 corresponds. For example, the vehicle exterior environment recognition device 120 can identify a leading vehicle that travels forward based on the relative distance, etc., and can further grasp the acceleration and deceleration of the leading vehicle by correctly recognizing whether the stop lamps of the leading vehicle are illuminated based on the color values. Moreover, the vehicle exterior environment recognition device 120 identifies a traffic sign located at a road shoulder or a gate, further recognizes the content of the traffic sign (e.g., a speed limit), and then controls the speed of the vehicle 1 at a safe speed within the speed limit through the vehicle control device 130.

Note that the relative distance can be found by converting the parallax information for every block in the distance image 128 into three-dimensional positional information by using a so-called stereo method. Here, the stereo method is a method of deriving the relative distance of the object with respect to the imaging devices 110 based on the parallax of the object by using a triangulation method.

Returning to FIG. 1, the vehicle control device 130 receives operator's operational inputs through a steering wheel 132, an accelerator or gas pedal 134, and a brake pedal 136, and transmits the operational inputs to a steering mechanism 142, a drive mechanism 144, and a brake mechanism 146, respectively, to control the vehicle 1. The vehicle control device 130 also controls the drive mechanism 144 and the brake mechanism 146 according to instructions from the vehicle exterior environment recognition device 120.

Next, a configuration of the vehicle exterior environment recognition device 120 is described in detail. Here, particular processing of the traffic sign that is a feature of this example is described in detail, and description of configurations unrelated to the feature of this example is omitted.

Vehicle Exterior Environment Recognition Device 120

Figure 3:
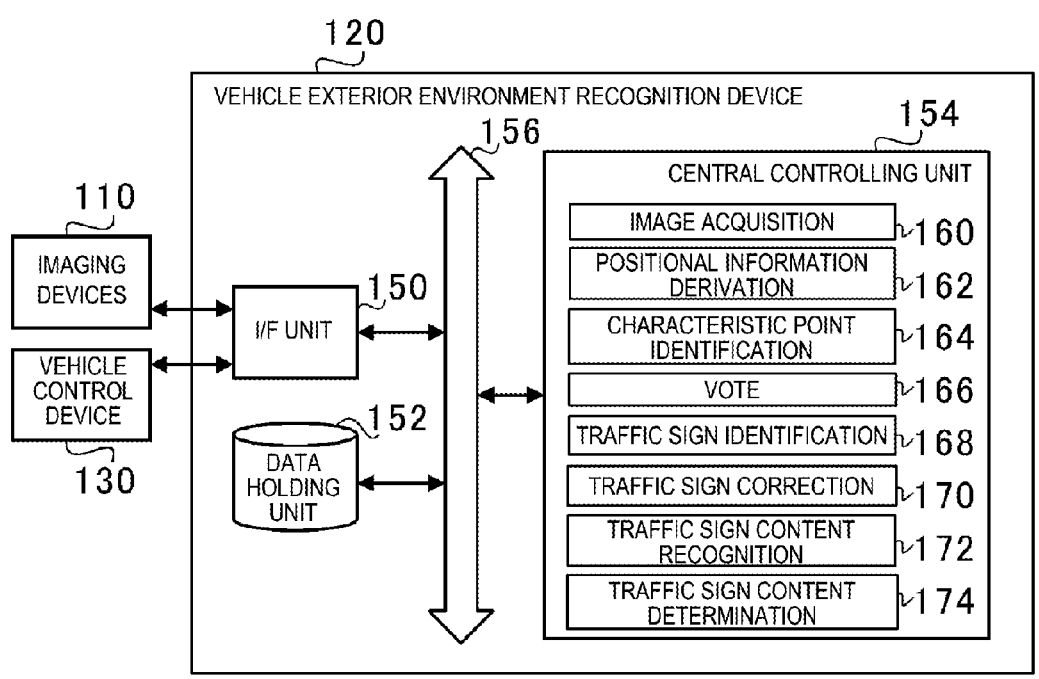
FIG. 3 is a functional block diagram schematically illustrating functions of a vehicle exterior environment recognition device.

FIG. 3 is a functional block diagram schematically illustrating functions of the vehicle exterior environment recognition device 120. As illustrated in FIG. 3, the vehicle exterior environment recognition device 120 is comprised of an I/F unit 150, a data holding unit 152, and a central controlling unit 154.

The I/F unit 150 is an interface that performs bidirectional information exchanges with the imaging device 110 or the vehicle control device 130. The data holding unit 152 is comprised of one or more RAMs, one or more flash memories, one or more HDDs, etc., and holds various information required for the processing of each functional module described below. The data holding unit 152 temporarily holds images received from the imaging devices 110 (the color image 126 and distance image 128 based on the first image and the second image).

The central controlling unit 154 is comprised of one or more semiconductor integrated circuits that include one or more central processing units (CPUs), one or more ROMs where one or more programs, etc. are stored, one or more RAMs as work areas, etc. The central controlling unit 154 controls the I/F unit 150, the data holding unit 152, etc. through a system bus 156. In this example, the central controlling unit 154 also functions as an image acquiring module 160, a positional information deriving module 162, a feature point identifying module 164, a voting module 166, a traffic sign identifying module 168, a traffic sign correcting module 170, a traffic sign content recognizing module 172, and a traffic sign content determining module 174. Next, traffic signs that are targets to be recognized in this example are described, and, after that, vehicle exterior environment recognition processing that is a feature of this example will be described in detail, considering operation of each functional module of the central controlling unit 154.

Figure 4A:
FIGS. 4A to 4C are diagrams illustrating traffic signs.
Figure 4B:
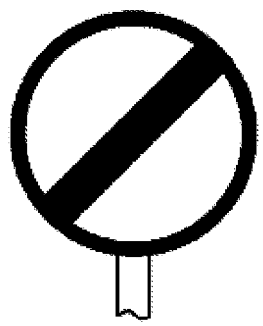
Figure 4C:

FIGS. 4A to 4C are diagrams illustrating traffic signs. Some categories of the traffic signs are a traffic sign that presents a speed limit and a traffic sign that presents a removal of the speed limit. As illustrated in FIG. 4A, the traffic sign that presents the speed limit is such that a numerical value indicative of the speed limit is indicated inside a circular frame line. The traffic signs that present a removal of the speed limit are such that, as illustrated in FIG. 4B, a slanted line (either right side up or left side up) is indicated in a plain background, or as illustrated in FIG. 4C, the same slanted line is indicated over the background of the numerical value indicative of the speed limit.

Indication types of the traffic sign are an electric light display type having one or more light sources, such as LEDs, and a non-electric light display type that is painted in different colors without having any light sources. Further, installing locations of the traffic sign are at a road shoulder, and on a gate that is built in an arch shape between both road shoulders (particularly, a location corresponding above the road).

The vehicle exterior environment recognition device 120 of this example recognizes the contents of the traffic signs that differ in the installing locations, indication types, and categories, by the functional modules of the central controlling unit 154 described above. When the vehicle exterior environment recognition device 120 recognizes the content of the traffic sign, it can inform a vehicle operator about the content (for example, the speed limit of the currently-traveling road, or the fact of overspeeding if the current speed is exceeding the speed limit), or can control the vehicle control device 130 so as not to exceed the speed limit. Thus, there is not necessary to recognize the traffic sign exactly when the vehicle 1 reaches the position where it can examine the traffic sign, but it may be sufficient to do so when the vehicle just passed the traffic sign, or even after that. Therefore, it is sufficient to recognize the traffic sign over a plurality of frames and conclusively determine the content of the traffic sign based on the information of the plurality of frames.

Vehicle Exterior Environment Recognition Processing

Figure 5:
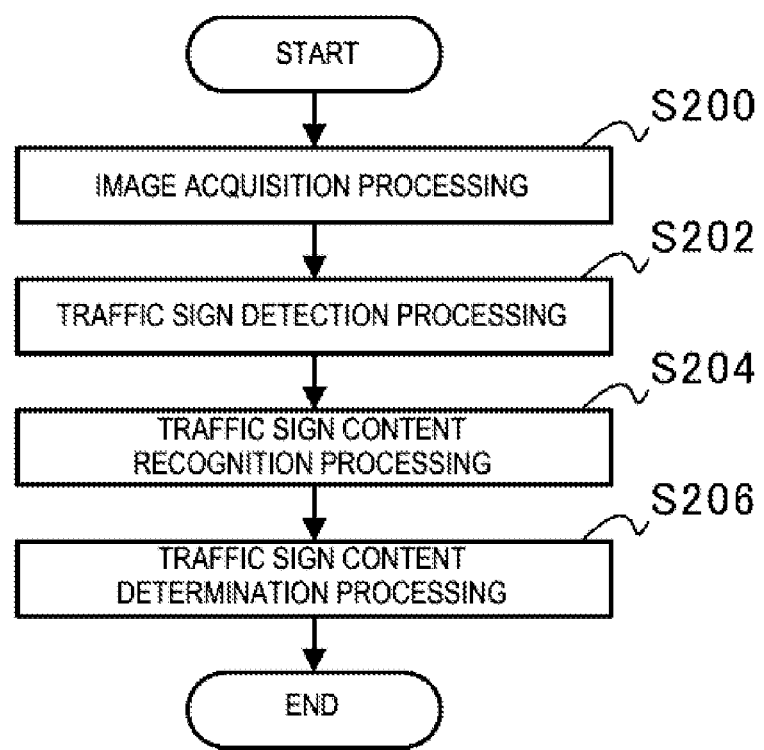
FIG. 5 is a flowchart illustrating a flow of vehicle exterior environment recognition processing.

FIG. 5 is a flowchart illustrating a flow of the vehicle exterior environment recognition processing. The vehicle exterior environment recognition processing is roughly divided into and is performed in the order as follows: image acquisition processing in which the images are acquired (S200); traffic sign detection processing in which a traffic sign (particularly, the circular frame line) is detected (S202); traffic sign content recognition processing in which the content of the traffic sign (the numerical value or a graphical pattern) is recognized (S204); and traffic sign content determining processing in which the content of the recognized traffic sign is conclusively determined by integrating with time (S206).

Image Acquisition Processing S200

The image acquiring module 160 acquires the color images 126 from the imaging devices 110. As described above, there are different indication types, such as the electric light display type and the non-electric light display type, for the target traffic sign in this example, and there are different installing locations, such as at the road shoulder and on the gate. Therefore, the imaging devices 110 image two detection areas in two exposure modes (i.e., the first exposure mode and the second exposure mode) where the road shoulder and the gate can be detected, respectively, and the image acquiring module 160 acquires total of four color images 126 thus acquired.

Figure 6A:
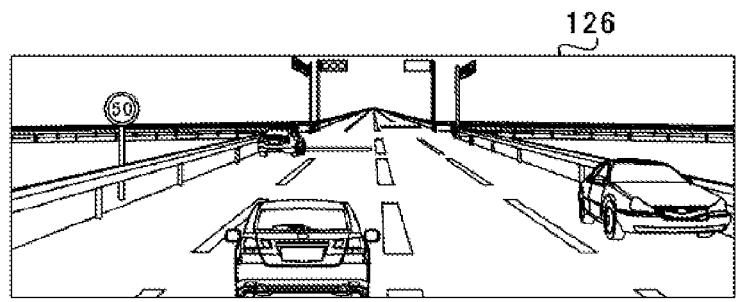
FIGS. 6A to 6D are diagrams illustrating color images acquired by an image acquiring module.
Figure 6B:
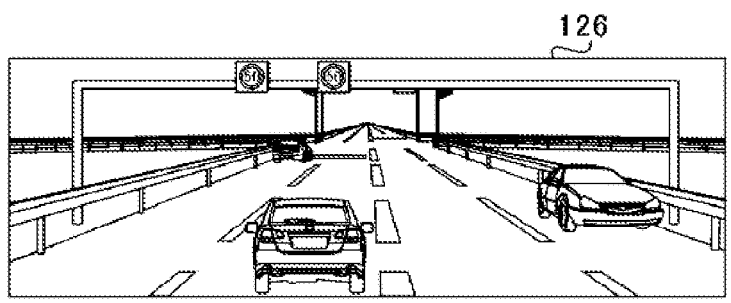
Figure 6C:
Figure 6D:
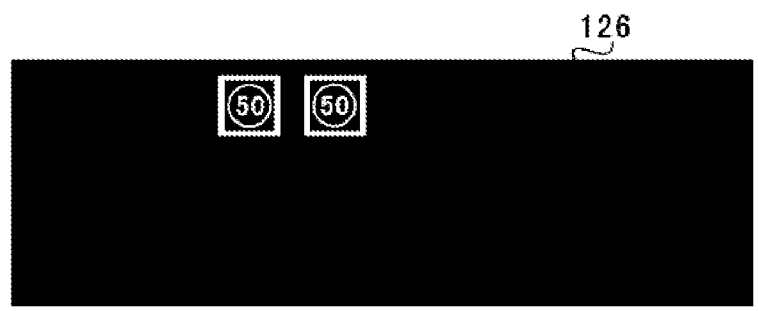

FIGS. 6A to 6D are diagrams illustrating the color images 126 acquired by the image acquiring module 160. For example, the imaging devices 110 image the color images 126 illustrated in FIGS. 6A and 6B in the first exposure mode that is relatively long in the exposure time. Note that FIG. 6A illustrates the color image 126 obtained by imaging at an angle of view that can detect the road shoulders, and FIG. 6B illustrates the color image 126 obtained by imaging after the angle of view is switched wider than that of FIG. 6A in order to detect the gate. Then, the imaging devices 110 switch the exposure mode to the second exposure mode in which, for example, the exposure time is made relatively shorter, and image the color images 126 illustrated in FIGS. 6C and 6D. Note that the color images 126 of FIGS. 6C and 6D are imaged similarly to the color images 126 of FIGS. 6A and 6B before and after the angle of view is switched according to the detection target. Here, although the four color images 126 are illustrated, the number and type thereof can be suitably selected as long as the road shoulders and the gate are detectable.

Thus, the four color images 126 of different exposure modes and detection areas are acquired. That is, since the imaging is performed in the plurality of exposure modes and for the plurality of detection areas, troubles, such as luminances of light sources are saturated, and the resolution becomes low due to an excessively-large angle of view, can be resolved and, thus, the detection accuracy can fully be improved. These four color images 126 are imaged in a time-division manner, and the imaging order can suitably selected. Note that, in this example, since it is only necessary to recognize the traffic sign when or after the vehicle passes the traffic sign, it is not necessary to image the four color images 126 at the same timing.

The positional information deriving module 162 acquires the color images (FIGS. 6A and 6B) based on the first images imaged at the first exposure by the two imaging devices 110, and derives the parallax information including the parallaxes by using the pattern matching, and the screen positions indicative of the positions of blocks in the screen, to generate the distance image 128. Then, the positional information deriving module 162 converts the parallax information for every block within the detection area 124 in the distance image 128 by using the stereo method into three-dimensional positional information containing a horizontal distance x that is a horizontal relative distance centering on the horizontal center of the vehicle 1, a height y from a road surface, and a relative distance z with respect to the vehicle 1 in a depth direction. Note that the positional information deriving module 162 obtains a vertical position of the road surface in advance before converting into the three-dimensional positional information, and derives the height y from the road surface based on the relative distance between the vertical position of each block and the vertical position of the road surface. Here, the parallax information indicates the parallax of each block in the distance image 128, while the three-dimensional positional information indicates the information on the relative distance z of each block in real space. If the parallax information is derived not pixel by pixel but by block by block (i.e., by a plurality of pixel units), the calculation can be performed pixel by pixel, considering that the parallax information applies to all the pixels belonging to the block concerned. For the conversion into the three-dimensional positional information, since known arts such as Japanese Unexamined Patent Application Publication (JP-A) No. 2013-109391 can be referred, detailed description thereof is omitted herein.

Traffic Sign Detection Processing S202

Particularly in this example, the target of recognition is a circular traffic sign among others. Such a circular traffic sign is detected by using the Hough transform. Here, the Hough transform is a technique to vote for the feature points on the color image where an object possibly exists to detect the object with the large number of votes (equal to or more than a predetermined value). Thus, although the Hough transform is particularly described in this example, various known shape recognition approaches, such as template matching and least-squares method, can also be used other than the Hough transform, for applications in which the traffic sign can be identified in any partial processing of the vehicle exterior environment recognition processing without depending on the Hough transform.

FIG. 7 and FIGS. 8A to 8D are diagrams illustrating the Hough transform. Here, suppose that three pixels 220c, 220d, and 220e having an edge are extracted from the color image 126 as illustrated in the part (a) of FIG. 7. Originally, although these three pixels 220c, 220d, and 220e are part of a circular traffic sign 222, that the traffic sign has a circular shape cannot normally be clearly grasped from the color image 126.

Figure 7:
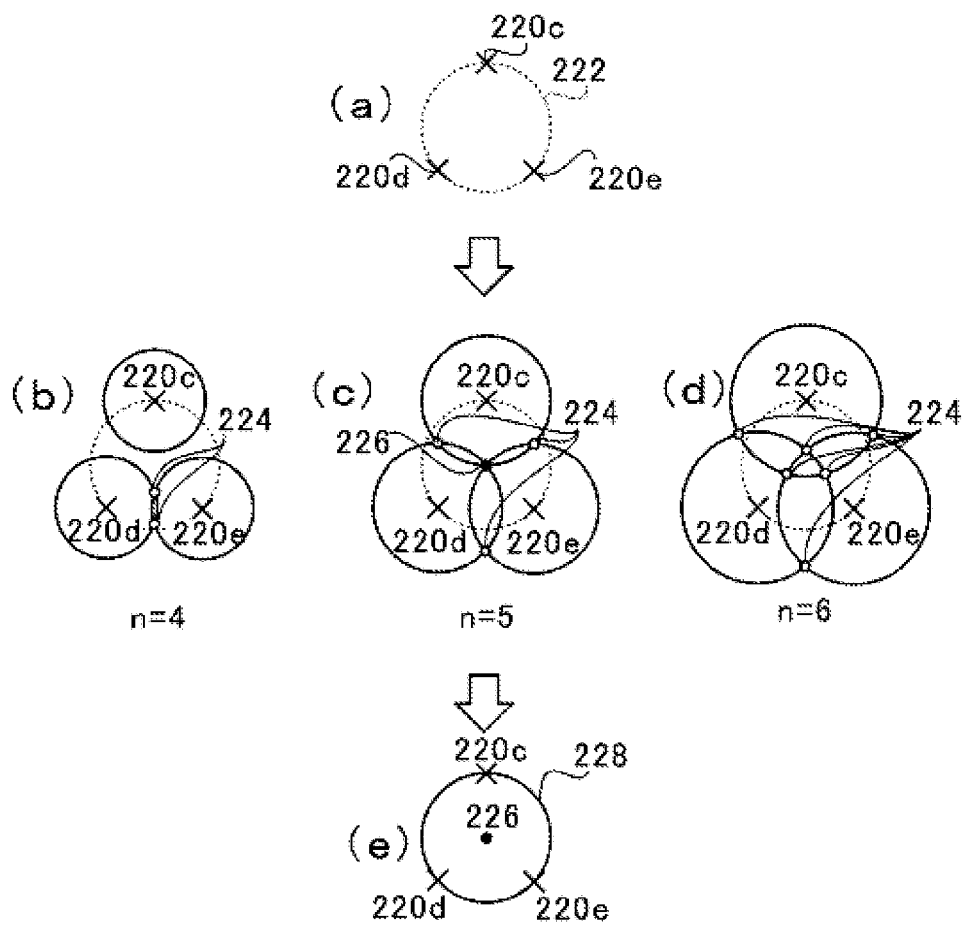
FIG. 7 is a diagram illustrating the Hough transform.

The Hough transform is an approach of detecting a geometric shape, such as a circle and a straight line, from a plurality of points, and it is based on theory that the center of a circle that passes through an arbitrary pixel 220 and has a radius n exists on the circumference of the radius n centering on the arbitrary pixel 220. For example, the center of the circle that passes through the three pixels 220c, 220d, and 220e in the part (a) of FIG. 7 is on the circumferences centering on the three pixels 220c, 220d, and 220e. However, since the radius n cannot be identified based on the information only on the edge, a plurality of radii n that are different from each other are prepared, pixels on the circles of the plurality of radii n centering on the three pixels 220c, 220d, and 220e are voted, and if the number of votes obtained becomes equal to or greater than the predetermined value, the radius n and the center are determined to be the traffic sign 222.

For example, as illustrated in the parts (b), (c), and (d) of FIG. 7, circles having different radii n=4, 5, and 6 are formed centering on the three pixels 220c, 220d, and 220e, and the pixels contained in the loci of the circles are voted (unit indices are associated). Then, in the part (b) of FIG. 7, the number of votes obtained becomes 2 at two pixels 224 (two unit indices are associated). Further, in the part (c) of FIG. 7, the number of votes obtained becomes 2 at three pixels 224, and the number of votes obtained becomes 3 at one pixel 226. Similarly, in the part (d) of FIG. 7, the number of votes obtained becomes 2 at six pixels 224.

At this time, it is only the pixel 226 of which the number of votes obtained becomes 3 (i.e., equal to or greater than the predetermined value), the pixel 226 is used as the center of a circle that passes through the three pixels 220c, 220d, and 220e, and the radius n=5 at the time of deriving the pixel 226 concerned can be identified as the radius of the circle. Thus, as illustrated in the part (e) of FIG. 7, a circle 228 that passes through the three pixels 220c, 220d, and 220e is identified. Here, although the three pixels 220c, 220d, and 220e are described as one example for convenience of explanation, since a pixel that is not contained in the circle 228 may be used as the feature point or the pixel that appears at a position different from an original position due to pixelization (dispersion) may be used as the feature point, a number of points are actually used for the votes in order to avoid the effects of such noise and, thus, a stable detection can be performed by majority rule. In this example, such Hough transform is applied to the color image 126 illustrated, for example, in FIG. 6B, and the circular traffic sign is identified by the feature point identifying module 164, the voting module 166, and the traffic sign identifying module 168. Next, fundamental processing of each functional module is described with reference to FIGS. 8A to 8D.

First, the feature point identifying module 164 identifies the feature point corresponding to part of the circumference based on the color image 126 (feature point identifying processing). For example, suppose that the feature point identifying module 164 identifies pixels 220f, 220g, 220h, 220i, 220j, and 220k having edges as feature points in the color image 126 of FIG. 8A. Note that the dotted line in FIG. 8A corresponds to a traveling lane.

Figure 8A:
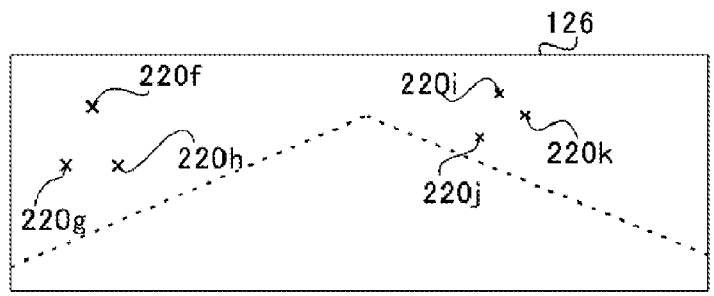
FIG. 8A to 8D are diagrams illustrating the Hough transform.
Figure 8B:
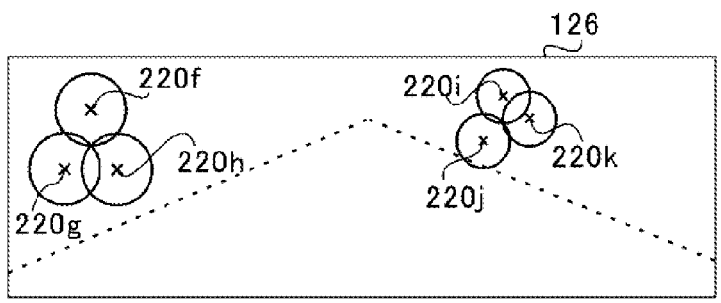
Figure 8C:
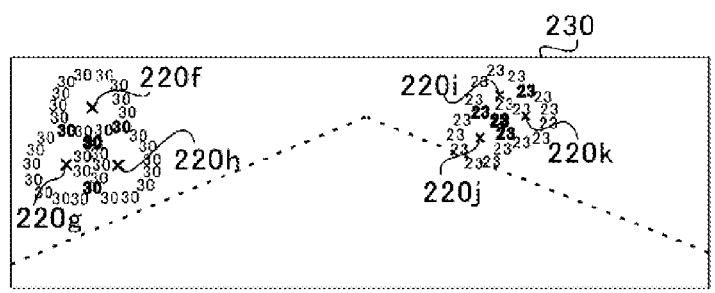

Next, the voting module 166 votes for a predetermined distance corresponding to the radius n from the feature points (voting processing). Here, for the six pixels 220, the radius n is temporarily set to 30 pixels for the pixels 220f, 220g, and 220h, and the radius n is temporarily set to 23 pixels for the pixels 220i, 220j, and 220k, for convenience of explanation. The voting module 166 votes, in the color image 126 of FIG. 8B, for all the pixels on circles having the radius n (30 pixels and 23 pixels) from the pixels 220, centering on the pixels 220f, 220g, 220h, 220i, 220j, and 220k, respectively. Then, the voting targets (pixel and the radius n) in the vote table 230 illustrated in FIG. 8C are voted (added) by 1. The vote table 230 is a voting space by the Hough transform, and it is expressed by three dimensions of the screen positions (x, y) of the pixel and the radii n that are used as the voting targets.

Figure 8D:
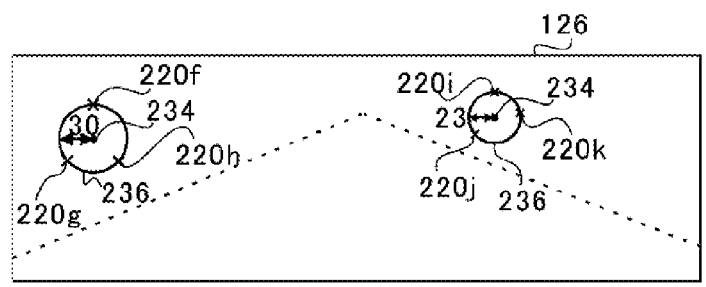

Next, the traffic sign identifying module 168 detects the number of votes obtained in the vote table 230, and derives the center and the radius n of the circle based on the pixel and the radius n of the voting target with a large number of votes obtained. Then, as illustrated in FIG. 8D, a circle 236 of the radius n that is read centering on the pixel 234 with a large number of votes obtained is formed, and the circle is identified as a traffic sign (traffic sign identifying processing). Next, particular operations of the feature point identifying processing, the voting processing, and the traffic sign identifying processing performed by the feature point identifying module 164, the voting module 166, and the traffic sign identifying module 168, respectively, are described.

Feature Point Identifying Processing

The feature point identifying module 164 uses the color image 126, and selects one pixel 220 having predetermined edge intensity among the pixels 220 as a candidate of the feature point, which serves as a first extraction condition. The edge intensity may be expressed, for example, by the Sobel filter. Assume that the coordinates of each pixel 220 are (i, j) and the luminance is A(i, j), the feature point identifying module 164 uses the following Equation 1 to derive the sum of absolute values of a vertical Sobel filter and a horizontal Sobel filter, and selects the pixel (i, j) as a candidate of the feature point if the sum value (edge intensity) is equal to or greater than the predetermined value.

Edge intensity=$|A(i+1,j+1)+2A(i+1,j)+A(i+1,j-1)-A(i-1,j+1)-2A(i-1,j)-A(i-1,j-1)|+|A(i+1,j+1)+2A(i,j+1)+A(i-1,j+1)-A(i+1,j-1)-2A(i,j-1)-A(i-1,j-1)|$  (Equation 1)

Here, although one example in which the edge intensity is derived by the Sobel filter is described, various known techniques, such as the Prewitt filter, can also be applied without limiting to the Sobel filter.

Further, the feature point identifying module 164 uses the color image 126, and selects one pixel 220 among the pixels 220 as a candidate of the feature point, which serves as a second extraction condition, if a predetermined color component of the predetermined color values of the selected pixel 220 (e.g., a V-component in the color space of YUV form) is equal to or greater than the predetermined value. The traffic sign that presents a speed limit is comprised of a red circle along the circumference, and the traffic sign that presents a removal of the speed limit is comprised of a white circle or a black circle along the circumference. Therefore, only the color belonging to an area where the V-component is equal to or greater than the predetermined value is extracted, and it is used as a candidate of the feature point. Thus, the green pixels, such as trees, which can be observed often during traveling, can be excluded, and a suitable narrowing of the feature points becomes possible.

Note that, if the color image is comprised of a color space of RGB form, it is converted into a color space of YUV form by a suitable conversion. Since such conversions are known arts, detailed description is omitted herein.

The feature point identifying module 164 uses the distance image 128, and selects one pixel 220, which satisfies any one or more conditions, among the pixels 220 as a candidate of the feature point, which serves as a third extraction condition, where the conditions are the relative distance z is within a predetermined range, the height y from a road surface is within a predetermined range, and the horizontal distance x is within a predetermined range.

Particularly, the feature point identifying module 164 extracts one pixel 220 from the distance image 128, refers to the three-dimensional positional information on the pixel 220, and if the relative distance z of an object corresponding to the pixel 220 is located, for example, equal to or higher than 10 m and less than 50 m, the feature point identifying module 164 selects the pixel 220 as the candidate of the feature point. This is because a traveling distance of the object on the image within the exposure time becomes longer if the object is located lower than 10 m, and the effects of a blur of the image becomes greater accordingly. Further, if the object is located equal to or higher than 50 m, the content of the traffic sign cannot often be correctly recognized because of the resolution of the image. Thus, the processing load and erroneous recognition can be reduced by limiting the relative distance z.

Further, if the height y of the object from the road surface corresponding to the pixel 220 concerned is located, for example, equal to or higher than 0.5 m and lower than 6.0 m, the feature point identifying module 164 selects the pixel 220 as a candidate of the feature point. Because the range is set to "equal to or higher than 0.5 m," road markings and lanes can be excluded from the recognition target, and because the range is set to "lower than 6.0 m," trees or the like located higher can be excluded. The processing load and the erroneous recognition can be reduced by the conditions concerned.

Further, if the horizontal distance x of the object corresponding to the pixel 220 concerned is located, for example, within a range of 12 m (equal to or higher than −12 m and lower than 12 m), the feature point identifying module 164 selects the pixel 220 as the candidate of the feature point. Traffic signs other than the traffic signs related to the lane where the vehicle 1 is traveling can be excluded by setting the range to 12 m. The processing load and the erroneous recognition can be reduced by the conditions concerned.

Moreover, the feature point identifying module 164 uses the color image 126 and the distance image 128, and selects pixels 220 as candidates of the feature point, which serve as a fourth extraction condition, where the pixels 220 are adjacent pixels of which a difference of at least one color component (e.g., U-component) is within a predetermined range, and such pixels 220 are not successively located equal to or greater than a predetermined distance (length) in a predetermined direction.

Figure 9A:
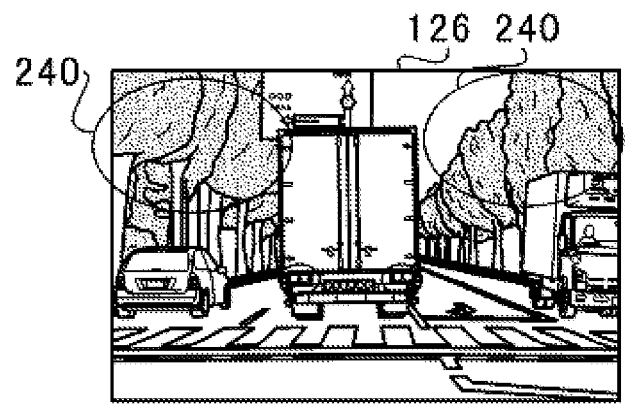
FIGS. 9A and 9B are diagrams illustrating a fourth extraction condition.
Figure 9B:
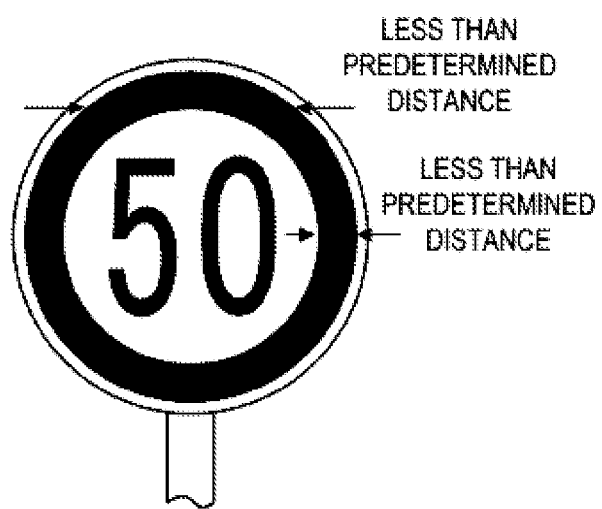

FIGS. 9A and 9B are diagrams illustrating the fourth extraction condition. For example, a tree 240 with autumnal red leaves (turned-red tree) or the like that is illustrated at a road shoulder in FIG. 9A may satisfy all of the first to third extraction conditions. Since the turned-red tree 240 has many parts that can be recognized as textures, it may often be extracted as feature points over a large area thereof. Therefore, feature points are identified over the large area of the tree 240 or the like with many textures, and the processing load increases.

For this reason, the feature point identifying module 164 determines whether the distance between the pixels 220, that is, any one of the depth distance, the vertical distance, and the horizontal distance, or a synthetic distance of any two or more is, for example, shorter than the predetermined distance (e.g., 0.5 m), and the difference of one color component (e.g., U-component) is equal to or less than the predetermined value (e.g., 10). Then, if the pixels 220 of which the synthetic distance is shorter than 0.5 m and the difference of U-component is equal to or less than 10 continue for 30 pixels in one direction (e.g., horizontal direction) of the screen, the feature point identifying module 164 excludes all the pixels 220 from the feature points. As illustrated in FIG. 9B, the circumference of the traffic sign is comprised of a circle of the same color, but the pixels do not continue for 30 pixels the predetermined direction, for example, the horizontal direction or the vertical direction. Since the feature points are identified based on such characteristics of the indication type of the traffic sign, the pixels 220 that should not originally be extracted as the feature points but that satisfy the first to third extraction conditions can be excluded, and the identifying efficiency of the feature points can be improved.

Note that the size of the traffic sign varies in the color image 126 depending on the relative distance z. Thus, the feature point identifying module 164 may change the predetermined distance that is a threshold for determining whether the pixels 220 continue in the predetermined direction, according to the relative distance z with respect to the vehicle 1. Particularly, the predetermined distance is made longer as the relative distance z becomes shorter, and, on the other hand, the predetermined distance is made shorter as the relative distance z becomes longer. By doing so, a suitable threshold can be provided according to the size of the traffic sign in the color image 126, and it becomes possible to appropriately exclude the pixels 220 that should not originally be extracted as the feature points but that satisfy the first to third extraction conditions.

Then, the feature point identifying module 164 identifies the pixels 220 that satisfy the first or second extraction condition as the feature points among the pixels 220 that satisfy both the third and fourth extraction conditions. Thus, the pixels 220 suitable for the feature points are identified.

The feature point identifying module 164 may suspend the feature point identifying processing concerned in one frame when the number of feature points becomes equal to or more than a predetermined value. The color image 126 may change variously according to the vehicle exterior environment, and the number of feature points may increase dramatically according to the imaged environment. If the number of feature points thus increases, the processing load increases accordingly, and the processing time may exceed a time period assigned to one frame. Therefore, when the number of feature points becomes equal to or greater than the predetermined value, the feature point identifying module 164 suspends the feature point identifying processing concerned in one frame, and carries out the voting processing and subsequent processing only for the feature points identified by this time point.

Note that, since the traffic sign is often located comparatively upwardly in the color image 126, the feature point identifying module 164 identifies the feature points sequentially from the upper part of the color image 126. Thus, it becomes possible to appropriately extract the feature points corresponding to the part of the circumference of the traffic sign.

In order to keep the number of feature points equal to or less than the predetermined value as described above, the feature point identifying module 164 may change the predetermined value of the edge intensity on the first extraction condition and the predetermined value of V-component on the second extraction condition for each frame. Since the vehicle exterior environment does not change much between frames, the number of feature points does not change so much, either. Therefore, when many feature points are extracted in one frame, many feature points are extracted continuously also in subsequent frames. For this reason, the predetermined value of the edge intensity on the first extraction condition and the predetermined value of V-component on the second extraction condition are adjusted within a predetermined range (40 to 150), while the number of feature points is kept within a predetermined range (200 to 2000) so that the processing time does not exceed the time period assigned to the identification of the feature points in one frame.

Figure 10A:
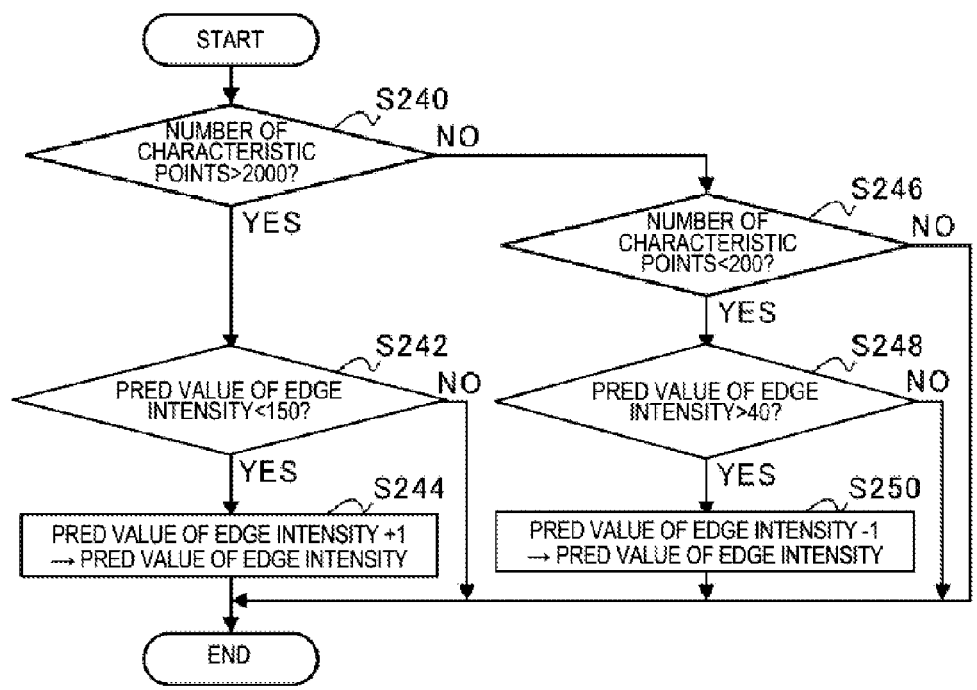
FIGS. 10A and 10B are flowcharts illustrating examples of feature point identifying processing.
Figure 10B:
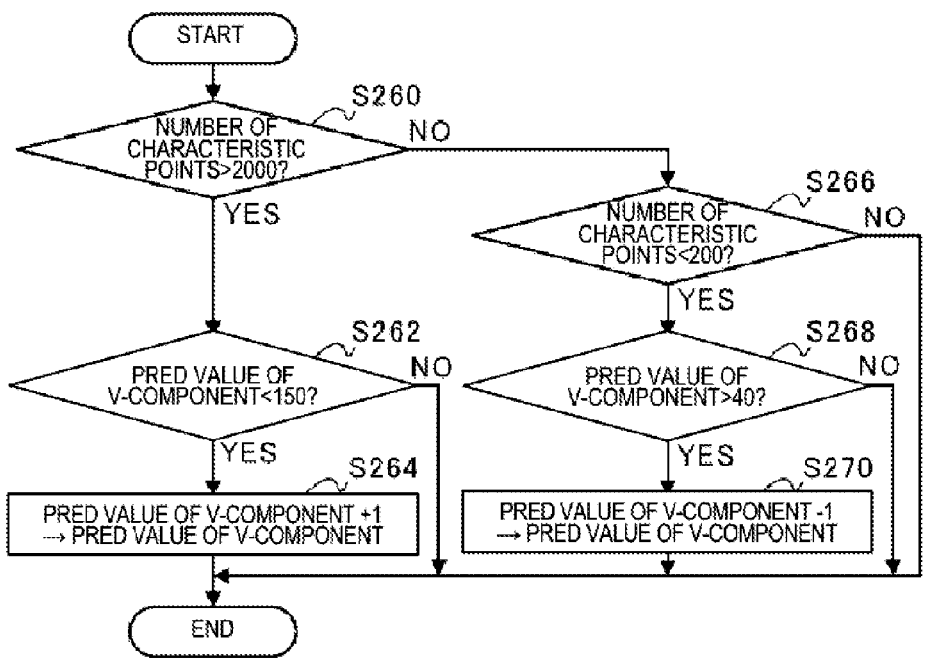

FIGS. 10A and 10B are flowcharts illustrating examples of the feature point identifying processing. As illustrated in FIG. 10A, the feature point identifying module 164 determines whether the number of feature points extracted in one frame on the first extraction condition exceeds the feature point upper limit (here, 2000) (S240). As a result, if the number of feature points exceeds the feature point upper limit (YES at S240), the feature point identifying module 164 determines whether the predetermined value of the edge intensity is less than the edge intensity upper limit (here, 150) (S242). As a result, if the predetermined value of the edge intensity is less than the edge intensity upper limit (YES at S242), the feature point identifying module 164 increments the predetermined value of the edge intensity (S244). The predetermined value of the edge intensity is reflected to the feature point identifying processing of the subsequent frames. If the predetermined value of the edge intensity is equal to or greater than the edge intensity upper limit (NO at S242), the feature point identifying module 164 does not increment the predetermined value of the edge intensity, but maintains the predetermined value that reached the edge intensity upper limit (it is maintained within the predetermined range).

At Step S240, if the number of feature points is equal to or less than the feature point upper limit (NO at S240), the feature point identifying module 164 determines whether the number of feature points extracted in one frame is less than the feature point lower limit (here 200) (S246). As a result, if the number of feature points is less than the feature point lower limit (YES at S246), the feature point identifying module 164 determines whether the predetermined value of the edge intensity exceeds the edge intensity lower limit (here, 40) (S248). As a result, if the predetermined value of the edge intensity exceeds the edge intensity lower limit (YES at S248), the feature point identifying module 164 decrements the predetermined value of the edge intensity (S250). If the predetermined value of the edge intensity is equal to or less than then edge intensity lower limit (NO at S248), the feature point identifying module 164 does not decrement the predetermined value of the edge intensity, but maintains the predetermined value that reached the feature point lower limit (it is maintained within the predetermined range). If the number of feature points is equal to or greater than the feature point lower limit (NO at S246), the feature point identifying module 164 does not carry out any process.

As illustrated in FIG. 10B, the feature point identifying module 164 determines whether the number of feature points extracted in one frame on the second extraction condition exceeds the feature point upper limit (here, 2000) (S260). As a result, if the number of feature points exceeds the feature point upper limit (YES at S260), the feature point identifying module 164 determines whether the predetermined value of V-component is less than the V-component upper limit (here, 150) (S262). As a result, if the predetermined value of V-component is less than the V-component upper limit (YES at S262), the feature point identifying module 164 increments the predetermined value of V-component (S264). The predetermined value of V-component is reflected to the feature point identifying processing of the subsequent frames. If the predetermined value of V-component is equal to or greater than the V-component upper limit (NO at S262), the feature point identifying module 164 does not increment the predetermined value of V-component, but maintains the predetermined value that reached the feature point upper limit (it is maintained within the predetermined range).

At Step S260, if the number of feature points is equal to or less than the feature point upper limit (NO at S260), the feature point identifying module 164 determines whether the number of feature points extracted in one frame is less than the feature point lower limit (here, 200) (S266). As a result, if the number of feature points is less than the feature point lower limit (YES at S266), the feature point identifying module 164 determines whether the predetermined value of V-component exceeds the V-component lower limit (here, 40) (S268). As a result, if the predetermined value of V-component exceeds the V-component lower limit (YES at S268), the feature point identifying module 164 decrements the predetermined value of V-component (S270). If the predetermined value of V-component is equal to or less than the V-component lower limit (NO at S268), the feature point identifying module 164 does not decrement the predetermined value of V-component, but maintains the predetermined value that reached the feature point lower limit (it is maintained within the predetermined range). If the number of feature points is equal to or greater than the feature point lower limit (NO at S266), the feature point identifying module 164 does not carry our any process.

As described above, in this example, the pixels 220 that satisfy either one of the first extraction condition and the second extraction condition are identified as the feature points. Therefore, the number of feature points is independently adjusted for the first extraction condition and the second extraction condition as illustrated in FIGS. 10A and 10B. Thus, the processing time assigned to the identification of the feature points in one frame is maintained by keeping the predetermined value of the edge intensity on the first extraction condition or the predetermined value of V-component on the second extraction condition within the predetermined range (40 to 150), while adjusting the number of feature points within the predetermined range (200 to 2000).

The feature point identifying module 164 may change the predetermined value of V-component on the second extraction condition for each frame according to the color component of a road surface. The color component throughout the color image 126 varies according to sunlight condition or lighting environment. For example, in a tunnel where orange lightings are installed, the V-component throughout the color image 126 increases. Therefore, the feature point identifying module 164 changes the predetermined value of V-component on the second extraction condition according to the color component of the road surface to reduce the effects of the changes of sunlight or lighting against the identification of the feature points.

Figure 11A:
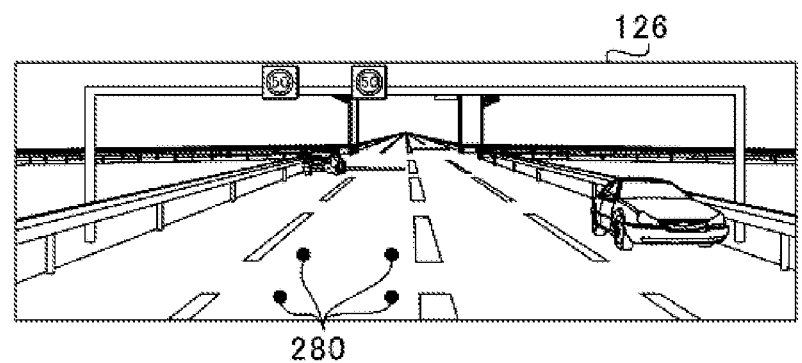
FIGS. 11A and 11B are diagrams illustrating one example of the feature point identifying processing.
Figure 11B:
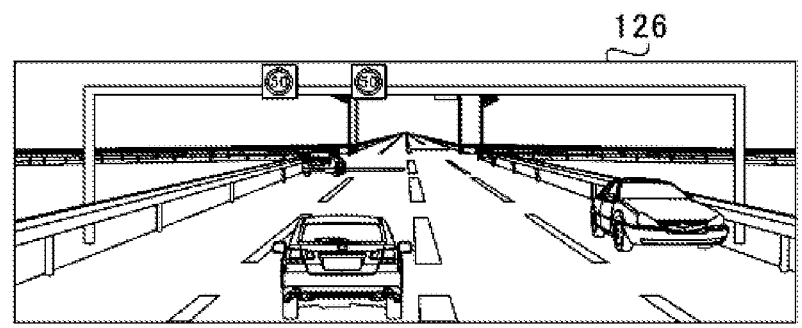

FIGS. 11A and 11B are diagrams illustrating one example of the feature point identifying processing. As illustrated in FIG. 11A, the feature point identifying module 164 acquires the color values of RGB form at 4 points 280 of the predetermined relative distance z where a road surface ahead of the vehicle is highly-possibly displayed in the color image 126. Then, the feature point identifying module 164 obtains G-component/R-component at each of the 4 points 280, and derives an average value AV of the values. Next, the feature point identifying module 164 multiplies the R-components of all the pixels in the color image 126 by the average value AV, converts them into YUV form, compares the V-component after the conversion with a predetermined value, and identifies the candidates of the feature point.

Note that, as illustrated in FIG. 11B, if the relative distance z of a leading vehicle recognized by the vehicle exterior environment recognition device 120 is within a predetermined range (e.g., equal to or less than 20 m), the feature point identifying module 164 does not calculate the average value AV from the color image 126, but uses another average value AV that is derived (used) for the previous frame. This is for avoiding that the color component of the leading vehicle is acquired as the color component of the road surface, this affects to the V-component, and the candidates of the feature point are erroneously extracted.

Moreover, regardless of the average value AV calculated for the current frame is not changed in the exposure mode from the average value AV derived (used) for the previous frame (there is no significant change in surrounding brightness), the average value AV is not calculated from the color image 126, but the average value AV derived (used) for the previous frame is used also when the change is equal to or greater than a predetermined value (e.g., ±50%). This is for avoiding that, when the road surface is painted in red, this affects to the V-component, and the candidates of the feature point are erroneously extracted. Note that, when shadows cover the road surface, since the color of gray influences equally on each color component of RGB form (R, G, and B) and does not affect to the value of G-component/R-component, this does not become a problem.

Voting Processing

The voting module 166 votes for the circumferences that are apart by the radius n from the feature points identified by the feature point identifying module 164. This is based on that, assuming the feature points correspond to parts of the circumferences, the centers of the circles of which the parts of the circumferences are the feature points must be located on the circumferences of the radius n from the feature points. Therefore, the voting module 166 further votes for the points of the radius n from the feature points, which may be the centers of the circles having the feature points as the parts of the circumferences.

Figure 12A:
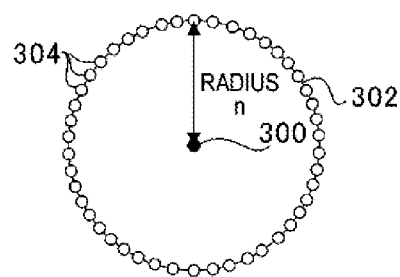
FIGS. 12A to 12C are diagrams illustrating voting processing.

FIG. 12 is a diagram illustrating the voting processing. As illustrated in FIG. 12A, if the radius n is described as one example, the voting module 166 normally uses all the pixels 220 on the circumference 302 of the radius n centering on a feature point 300 as corresponding points 304, and votes for points of the radius n at the screen position. However, since such corresponding points 304 of the radius n are all the pixels 220 on the circumference 302, they become too many, and if the radius n is varied, the number will be substantially infinitely too many. Therefore, the number of corresponding points 304 and the number of radii n corresponding to one radius n are limited in order to improve the efficiency of vote.

Here, it is known that the tangent of a circle is perpendicular to a line segment that connects between the center of the circle and the point of tangency. Further, the tangent of the circle corresponds to the edge extending direction of the pixels 220. Thus, the corresponding points 304 only appear on a line segment that is perpendicular to the edge extending direction of the feature point 300. Therefore, the voting module 166 can grasp the edge extending direction of the feature point 300, and define the corresponding points 304 in a direction perpendicular to the edge extending direction.

Here, if the luminance A at the coordinates (i, j) of each pixel 220 is indicated as A(i, j), the voting module 166 derives a line segment perpendicular to the edge extending direction based on a ratio of absolute values of a vertical Sobel filter and a horizontal Sobel filter, as illustrated in the following Equation 2.

Line segment perpendicular to edge extending direction=atan(|A(i+1,j+1)+2A(i,j+1)+A(i−1,j+1)−A(i+1,j−1)−2A(i,j−1)−A(i−1,j−1)|/|A(i+1,j+1)+2A(i+1,j)+A(i+1,j−1)−A(i−1,j+1)−2A(i−1,j)−A(i−1,j−1)|)     (Equation 2)

Here, although the example in which the line segment perpendicular to the edge extending direction is derived by using the Sobel filter is described, various known techniques can also be applied without limiting to the Sobel filter. Further, although the division and the arc tangent (atan) are used in Equation 2, if the processing load increases by these, a look-up table from which a unique line segment perpendicular to the edge extending direction can be derived using inputs of the absolute values of the vertical Sobel filter and the horizontal Sobel filter may be used.

Figure 12B:
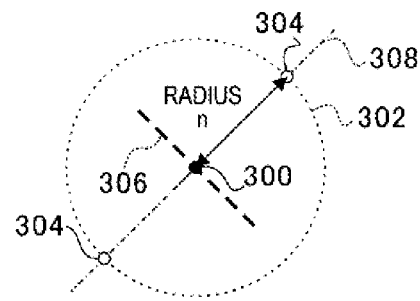

For example, as illustrated in FIG. 12B, if the edge extending direction of the feature point 300 is illustrated by a line segment 306 of a dashed line, corresponding points 304 can be defined on a line segment 308 of a dashed dotted line in a direction perpendicular to the line segment 306. Here, if one radius n is described, the corresponding points 304 can be narrowed down to two points that are apart from the feature point 300 by the radius n, and which are located on the line segment 308 in a direction perpendicular to the edge extending direction of the feature point 300.

Figure 12C:
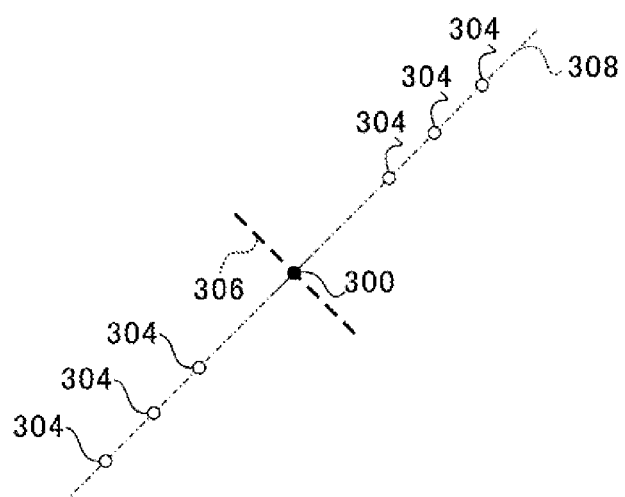

The traffic signs may be defined in one or more sizes by laws and/or rules of each country. Thus, the size of the traffic sign in the color image 126 can be defined based on the relative distance z. Therefore, the voting module 166 estimates the size of the traffic sign (radius n) in the color image 126 by using a inverse function of the function used for deriving the three-dimensional positional information, according to the relative distance z, and narrows the number of radii n to be used for vote. For example, if the traffic sign that presents the speed limit or the traffic sign that presents a removal of the speed limit is limited to three sizes, the corresponding points 304 are narrowed down to that number (3)×2, as illustrated in FIG. 12C.

Thus, since the corresponding points 304 of one radius n are limited on the line segment 308 in a direction perpendicular to the edge extending direction of the feature point 300, and the number of radii n is limited to one or more according to the predetermined sizes and the relative distance z, unwilling votes at which the corresponding points 304 should not originally exist can be avoided. Therefore, the erroneous detections of the traffic sign due to the erroneous setting of the corresponding points 304 can be prevented, while avoiding the needless Hough transform processing and reducing the processing load.

The voting module 166 votes in the vote table 230 after limiting the corresponding points 304 as described above. Although the three-dimensional voting space is described herein, a voting space of M dimension (M is a positive integer) that is extended in a lateral or vertical dimension (e.g., rotation) can also be formed in order to apply it to laterally-oriented traffic signs or inclined traffic signs.

Figure 13A:
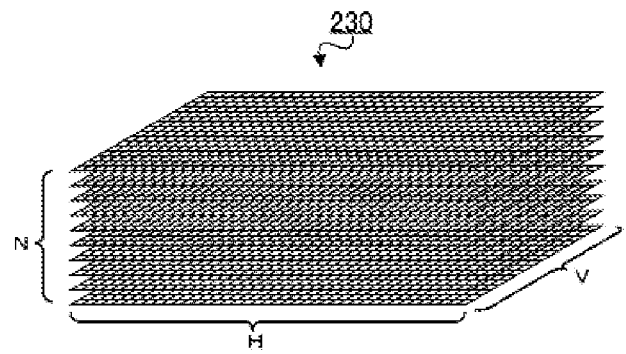
FIGS. 13A to 13C are diagrams illustrating a vote table.
Figure 13B:
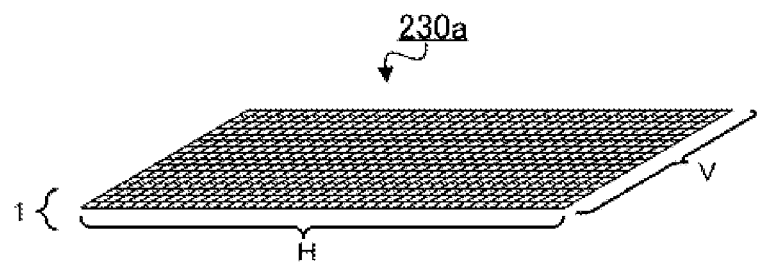
Figure 13C:
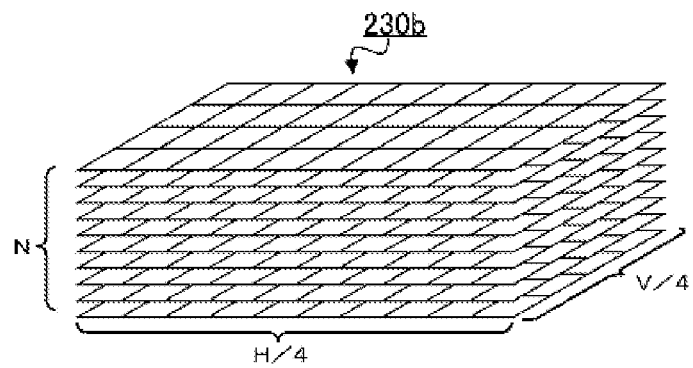

FIGS. 13A to 13C are diagrams illustrating the vote table 230. The vote table 230 is normally comprised of the three-dimensional voting space ([horizontal number of pixels H]×[vertical number of pixels V]×[value N that the radius n can take] in the color image 126) as illustrated in FIG. 13A, and the number of votes obtained is held at a three-dimensional position (point) of the pixel that serves as the voting target and that is comprised of the screen position (x, y) with the radius n. For example, if the maximum number of votes obtained is 255 (1 byte), the size of the vote table 230 is H×V×N (bytes). In such a case, if the color image 126 of high resolution is used, a problem that the storage area of the memory required for the vote table 230 becomes large is caused, and, if the number of votes obtained is limited (i.e., few), a problem that a peak of the number of votes obtained is difficult to appear due to the effects of noise, etc. is caused.

For the latter problem, it can be resolved by performing voting processing with added margins considering the noise, for example, voting for radii n near the corresponding point 304 in addition to the radius n of the corresponding points 304, a new problem in which the processing load increases accordingly will be caused. Alternatively, the resolution may be lowered, and, for example, the voting may be performed by block by block of 2 pixels in the horizontal directions×2 pixels in the vertical directions, a degradation of the identification accuracy of the traffic sign at the corresponding point 304 will not be avoidable because of the lowered resolution.

Therefore, in this example, two vote tables (a first vote table 230a and a second vote table 230b) having different dimensions and resolutions are provided, and the voting module 166 votes in the vote tables 230a and 230b simultaneously.

As illustrated in FIG. 13B, the vote table 230a is represented by the two-dimensional voting space (horizontal pixel position and vertical pixel position) that is reduced in the dimension by one, where the horizontal number of pixels H×the vertical number of pixels V remain for the resolution of the color image 126 and from which the information on the radius n is omitted. Therefore, the size of the vote table 230a is H×V (bytes), where the number of votes obtained for all the radii n is held at the two-dimensional positions of the screen positions (x, y) of the pixels that serve as the voting targets. On the other hand, as illustrated in FIG. 13C, the vote table 230b uses the same resolution (i.e., the value N) for the radius n, and does not omit any dimension. Instead, the vote table 230b compresses the horizontal and vertical resolutions of the color image 126 into one fourth (reducing the resolutions), and is illustrated by a three-dimensional voting space in which [horizontal number of pixels H/4 (the compressed value of the horizontal number of pixels)]× [vertical number of pixels V/4 (the compressed value of the vertical number of pixels)]. Therefore, the size of the vote table 230b is H/4×V/4×N (bytes), and the number of votes obtained is held at the three-dimensional positions comprised of the blocks (4 pixels in the horizontal directions×4 pixels in the vertical directions) to which the screen positions (x, y) of the pixels belong and the radius n, which serve as the voting target. Thus, the vote tables 230a and 230b intentionally lowers the resolution of the radius n, and intentionally lowers the resolution of the screen position, respectively.

The voting module 166 simultaneously votes for the vote tables 230a and 230b when it derives the corresponding points 304 based on the feature point 300. However, as for the vote table 230a, the voting module 166 votes for one point corresponding to the corresponding point 304 regardless of the radius n, and as for the vote table 230b, the voting module 166 votes for the points of the radius n of the blocks to which the corresponding points 304 belong. Thus, when the votes are finished, the voting module 166 can select a point with a large number of total votes obtained (corresponding point 304) of the radius n in the vote table 230a as the candidate of the center position of the traffic sign, and can select a radius n with a large number of votes obtained within the block corresponding to the center position concerned in the vote table 230b as the candidate of the radius n of the traffic sign.

Thus, the total storage capacity of the vote table 230 can be reduced to H×V+H/4×V/4×N (bytes), while maintaining the identification accuracy of the center of the traffic sign with high accuracy. Here, if H=600 pixels, V=200 pixels, and N=20 pixels, 600×200×20=2,400,000 bytes are originally required, it can be reduced to 600×200+600/4×200/4× 20=270,000 bytes equivalent to about ⅒ of the original capacity.

After the voting module 166 finishes the voting processing at all the feature points, it extracts the number of votes obtained from each point in the vote table 230, and selects the corresponding points 304 at which the total number of votes obtained of the radius n becomes equal to or greater than the predetermined value as the candidates of the center point of the traffic sign. However, even though the storage capacity of the vote table 230 is reduced, the determination of whether the number of votes obtained in the entire vote table 230 is large or small still takes a large processing load when the voting space is large to some extent. Therefore, the voting module 166 selects the candidate of the center point in parallel to the voting to improve the extraction efficiency of the candidate of the center point.

FIG. 14 is a diagram illustrating a center point candidate list 310. Here, the center point candidate list 310 is provided other than the vote table 230. At least the screen positions (x, y) for the vote table 230a are registered with the center point candidate list 310. Whenever the number of votes obtained in the vote table 230a at the currently-voting point reaches or becomes greater than a predetermined number, the voting module 166 additionally registers the corresponding point 304 corresponding to that point with the center point candidate list 310. Then, after the voting processing is finished at all the feature points, the voting module 166 selects only the corresponding points 304 that are registered with the center point candidate list 310 as the candidates of the traffic sign.

With this configuration, it is possible to appropriately extract the candidates of the center point, while avoiding the determination of whether the number of votes obtained in the entire vote table 230 is large or small (i.e., while reducing the processing load). Note that the voting module 166 limits the candidates of the center point that are registered with the center point candidate list 310 by up to the predetermined value (e.g., 50). This is based on the following reasons. That is, if the corresponding points 304 are distributed over the candidates of a plurality of center points due to the effects of noise, etc., it is originally a single traffic sign but a plurality of center points may be selected as the candidates. In such a case, an infinite number of center points should not be extracted as the candidates because the possibility that 50 or more traffic signs exist in the color image 126 is normally small. Thus, when the center point candidates in the center point candidate list 310 reach or become greater than 50, the voting module 166 suspends the voting processing concerned in one frame, and applies the traffic sign identifying processing and subsequent processing only to the center point candidates that have been identified by this time point.

Thus, the center point candidate list 310 is generated by the voting module 166, and the center point candidate list 310 is also associated with the information of the radius, the number of votes obtained in the vote tables 230a and 230b, and the three-dimensional position of the pixel concerned, other than the screen position (center position).

When the votes are made with the vote tables 230a and 230b in such a manner, the voting module 166 initializes each point of the vote tables 230a and 230b for the vote of the next frame so that the numbers of votes obtained are set to 0. However, the processing time required for the initialization of the vote tables 230a and 230b cannot be disregarded depending on the resolution of the color image 126, and it may occupy 40% of the entire sign detection processing S202. Since more storage capacity of the memory is taken up as the number of dimensions increases in the vote tables 230a and 230b, the effects of the load of the initialization processing become particularly large for the three-dimensional vote table 230b.

Figure 15:
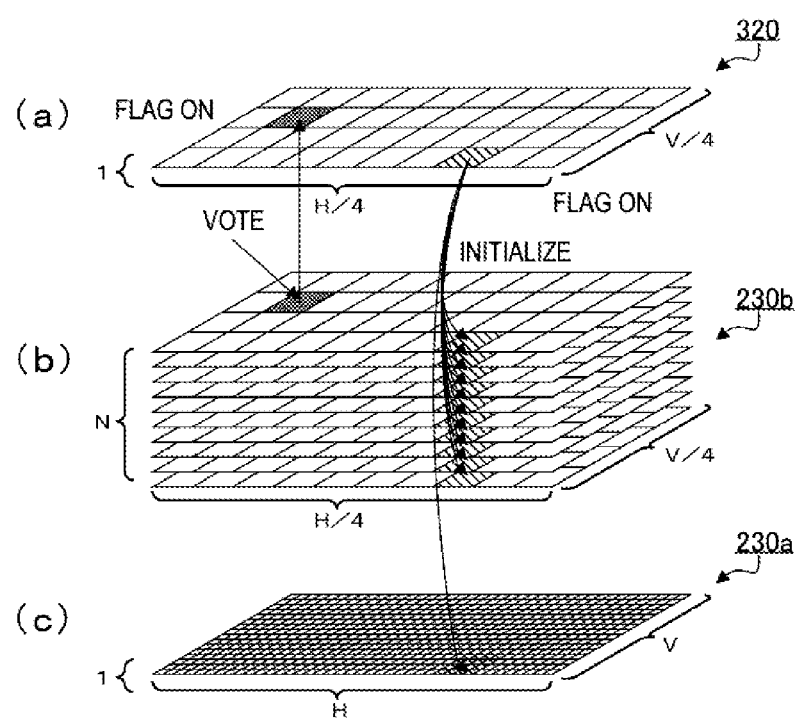
FIG. 15 is a diagram illustrating a flag table.

FIG. 15 is a diagram illustrating a flag table 320. Here, the flag table 320 is provided in addition to the vote tables 230a and 230b. As illustrated in the part (a) of FIG. 15, the flag table 320 is a table in which the number of dimensions is reduced by one dimension of the radius n, and a flag is set at the two-dimensional position of the block (4 pixels in the horizontal directions×4 pixels in the vertical directions) to which the screen position (x, y) of the pixel that serves as the voting target belongs. Therefore, the size of the flag table 320 is H/4×V/4 (bytes).

When the voting module 166 votes for any one of radii n of any one of blocks in the vote table 230b as illustrated by cross-hatching in the part (b) of FIG. 15, it changes the flag to ON of a block equivalent to the block in the flag table 320 illustrated by cross-hatching in the part (a) of FIG. 15. Therefore, when any one of the radii n in each block of the vote table 230b is voted, the block of the flag table 320 corresponding to the block of the vote table 230b is changed to ON. Then, when the votes to the vote tables 230a and 230b are finished, the voting module 166 initializes each point of only N blocks in the vote table 230b illustrated by hatching in the part (b) of FIG. 15, which correspond to the blocks at which the flags are ON in the flag table 320 illustrated by hatching in the part (a) of FIG. 15, so that the number of votes obtained is set to 0. In other words, the voting module 166 does not perform the initialization processing for other blocks in the vote table 230b corresponding to the block at which the flag is OFF in the flag table 320.

Here, although the vote table 230b is described as the target of the flag table 320, the concept of the flag table 320 can also be applied to the vote table 230 of which the size is H×V×N (bytes), without any limitation. In such a case, the size of the flag table 320 is H×V (bytes).

Alternatively, instead of providing the flag table 320, it may be determined whether the votes are performed for the area corresponding to each block in the vote table 230a, if the votes are performed, each point of only the blocks in the vote table 230b corresponding to that blocks may be initialized so that the number of votes obtained is set to 0. Thus, since it is unnecessary to initialize all points in the vote table 230b, the load of the initialization processing can be significantly reduced.

Alternatively, when the votes for the vote tables 230a and 230b are finished, the voting module 166 may initialize each point of only a plurality of pixels (4 pixels in the horizontal directions×4 pixels in the vertical directions) in the vote table 230a corresponding to the blocks at which the flags are ON in the flag table 320 as illustrated by hatching in the part (c) of FIG. 15, so that the number of votes obtained is set to 0. Thus, since it is unnecessary to initialize all points in the vote table 230a, similar to the vote table 230b, the load of the initialization processing can be significantly reduced.

Then, after the initialization processing is finished, the voting module 166 initializes all the flags in the flag table 320 to OFF. Thus, the vote table can be appropriately initialized without increasing the load of the initialization processing.

Traffic Sign Identifying Processing

The traffic sign identifying module 168 narrows down the candidates of the traffic sign derived by the voting module 166 based on the first to third narrowing conditions, and identifies the traffic sign.

The traffic sign identifying module 168 narrows down the radii n by the first narrowing condition (whether the number of votes obtained in the vote table 230a is equal to or greater than the predetermined value, and whether which the number of votes obtained at the block in the vote table 230b is equal to or greater than the predetermined value) to obtain the center points and the radii. Note that, as described above, the voting module 166 also registers, according to the numbers of votes obtained in the vote tables 230a and 230b, the corresponding points 304 with the center point candidate list 310 at suitable timings. However, the registration with the center point candidate list 310 is performed in the middle of the vote in which the final number of votes obtained is still unknown, and is not to determine the number of votes obtained at the time of the vote being finished. Thus, in this example, since the corresponding points 304 registered with the center point candidate list 310 are again compared uniformly with a larger predetermined value than that at the time of registration, it is possible to leave only appropriate corresponding points 304, while excluding other corresponding points 304 equivalent to noise.

Next, the traffic sign identifying module 168 derives, based on the center position and the radius n, a rectangular area of which one side has twice the length of the radius n and which is centering on the center position, as an occupying area. Note that, if the occupying areas overlap (superimpose) with each other for any two corresponding points 304, one area may become impossible to be recognized because of the other area. In such a case, if the traffic sign at the corresponding point 304 of the area that is impossible to be recognized is an important traffic sign, such as a traffic sign that presents a speed limit, a situation where such an important traffic sign is not recognized may be caused. Therefore, if an occupying area at one corresponding point 304 overlaps with another occupying area at the other corresponding point 304 in the screen (second narrowing condition), the traffic sign identifying module 168 excludes a less reliable one of the corresponding points 304 from the traffic sign, and leaves a more reliable traffic sign. Such a reliability of the traffic sign is calculated based on the comparison between the number of votes obtained in the two-dimensional vote table 230a and the number of votes obtained in the three-dimensional vote table 230b.

Figure 16:
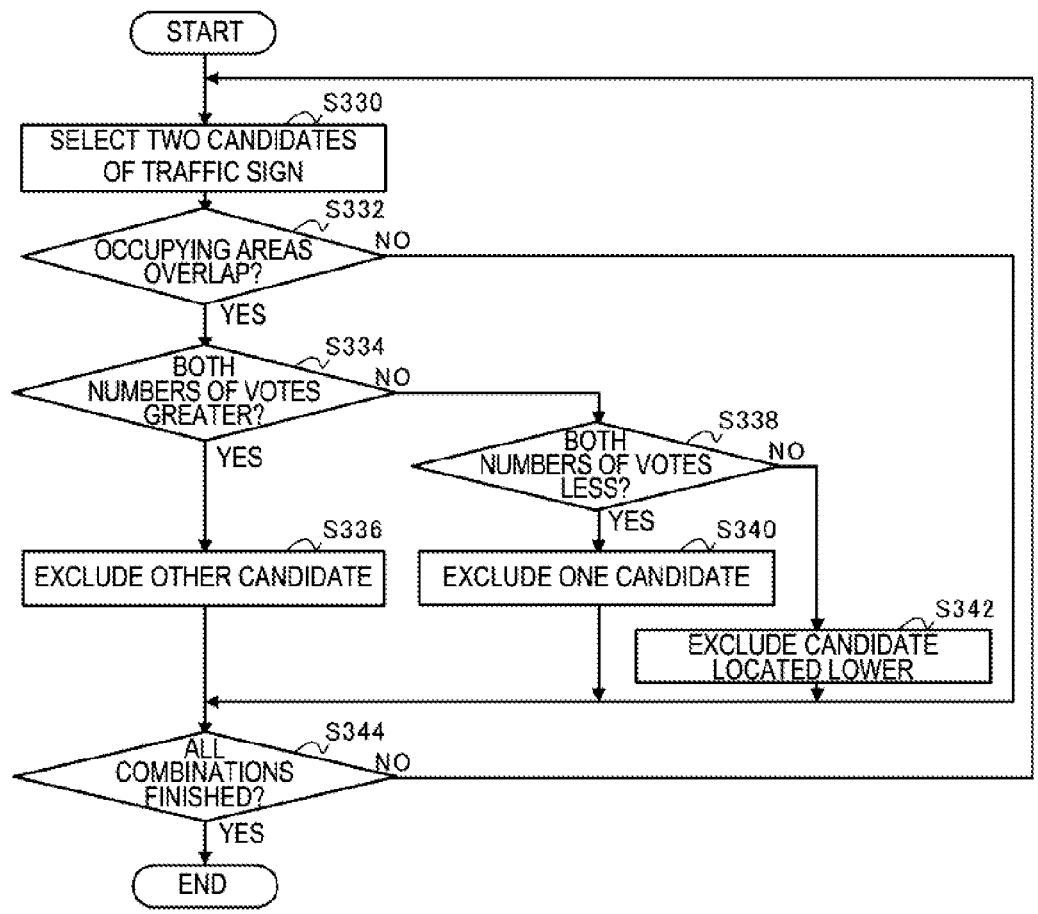
FIG. 16 is a flowchart illustrating one example of traffic sign identifying processing.

FIG. 16 is the flowchart illustrating one example of the traffic sign identifying processing. As illustrated in FIG. 16, the traffic sign identifying module 168 sequentially selects two candidates from the candidates of the traffic sign (S330). Then, the traffic sign identifying module 168 determines whether the occupying areas of the two selected candidates overlap with each other (S332). As a result, if the occupying areas of the two candidates overlap (YES at S332), the traffic sign identifying module 168 determines whether both the numbers of votes obtained C1 and D1 in the vote tables 230a and 230b of one of the candidates are greater than the number of votes obtained C2 and D2 in the vote tables 230a and 230b of the other candidate (S334). As a result, if both are greater, that is, if C1>C2 and D1>D2 (YES at S334), the traffic sign identifying module 168 excludes the other candidate (S336). If the occupying areas of the two candidates do not overlap (NO at S332), the processing transits to Step S344.

If other than C1>C2 and D1>D2 (NO at S334), the traffic sign identifying module 168 determines whether both the numbers of votes obtained C1 and D1 in the vote tables 230a and 230b of one of the candidates are less than the number of votes obtained C2 and D2 in the vote tables 230a and 230b of the other candidate (S338). As a result, if both are less, that is, if C1<C2 and D1<D2 (YES at S338), the traffic sign identifying module 168 excludes the one candidate (S340). Thus, if both the numbers of votes obtained in the vote tables 230a and 230b of the candidates are greater, both the candidates with less numbers of votes obtained are excluded, while leaving only greater numbers of votes obtained, because the reliability of the candidates with the greater numbers of votes obtained being a traffic sign is high.

If other than C1<C2 and D1<D2 (NO at S338), the traffic sign identifying module 168 excludes either one of the candidates that is located lower than the other, based on the positions of one candidate and the other candidate in the color image 126 (S342). Thus, since it cannot determine only by the numbers of votes obtained if either one of the numbers of votes obtained in the vote tables 230a and 230b of the candidates is greater and the other is less, only one candidate located higher is adopted and the other candidate located lower is excluded. This is because, if two traffic signs are disposed vertically at a higher position and a lower position, respectively, one traffic sign presenting a speed limit, which is relatively important, is disposed above the other traffic sign.

When the two candidates thus selected overlap, the traffic sign identifying module 168 determines whether all the combinations of two candidates to be selected have been finished after it determines that the one to be excluded (S344). As a result, if it has been finished (YES at S344), the traffic sign identifying module 168 ends the traffic sign identifying processing concerned, and if it has not been finished (NO at S344), the traffic sign identifying module 168 repeats the processing from Step S330. Thus, even if the occupying areas of the two candidates of the traffic sign overlap, it is possible to appropriately narrow down to a reliable candidate.

Next, the traffic sign identifying module 168 determines whether the candidate of the traffic sign narrowed down by the first and second narrowing conditions exceeds the candidate upper limit (here, 3), as the third narrowing condition. Here, if the candidate upper limit is exceeded, the traffic sign identifying module 168 narrows down the candidates to below the candidate upper limit, and does not perform subsequent processing for other candidates. Particularly, if the candidate of the traffic sign exceeds the candidate upper limit, the traffic sign identifying module 168 compares the horizontal distances x at the three-dimensional positions of all the candidates, and narrows the candidates of the candidate upper limit in order that the horizontal distance x from the lane of the vehicle 1 is shorter. Thus, the candidates near the lane of the vehicle 1 can be appropriately extracted, which are highly-possibly a traffic sign for the vehicle 1.

Next, the traffic sign correcting module 170 corrects the position and/or the size of the traffic sign that is narrowed down to the candidate upper limit or below the candidate upper limit. This is because the template matching is used for recognizing the content of the traffic sign in this example, and the template matching is significantly influenced on the recognition accuracy by positional offsets of the images. Thus, the center position and the radius n derived by the voting module 166 are corrected, and the occupying area of the traffic sign is again set. Therefore, the traffic sign correcting module 170 detects a red frame that exists in four horizontal and vertical directions from the center position of each candidate of the traffic sign, and corrects the occupying area to form a rectangular area that is circumscribed by the red frame (circumference part of the traffic sign). Particularly, the occupying area is corrected by the following procedures (1) to (7).

Figure 17A:
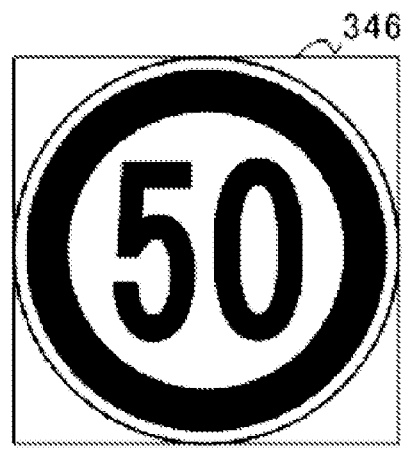
FIGS. 17A and 17B are diagrams illustrating processing of a traffic sign correcting module.
Figure 17B:
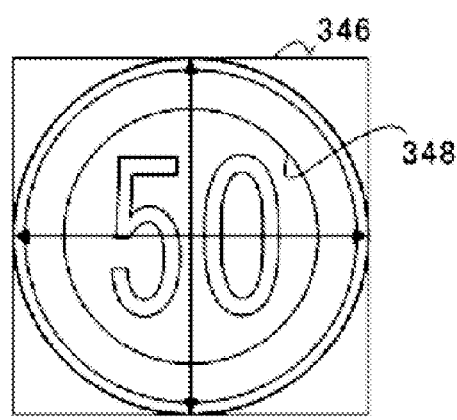

FIGS. 17A and 17B are diagrams illustrating processing of the traffic sign correcting module 170.

(1) First, the traffic sign correcting module 170 sets a rectangular area as an occupying area 346, of which one side is twice the length of the radius n and has the center at the center position, as illustrated in FIG. 17A, and calculates a histogram of V-component of the entire occupying area 346 (votes for the horizontal axis as the V-component). Then, the traffic sign correcting module 170 determines that the candidate concerned is a red frame, if a difference between the maximum value and the minimum value of the histogram of V-component becomes equal to or greater than a predetermined value. If the difference between the maximum value and the minimum value of the histogram of V-component is less than the predetermined value, the traffic sign correcting module 170 determines that the candidate concerned is a black frame, and replaces the histogram of V-component by a histogram of Y component. Although the correction processing of the occupying area 346 is described using the candidate with the red frame as an example, the processing is also applicable to a black frame.

(2) The traffic sign correcting module 170 derives a value of V-component (threshold Vthr) that corresponds to a predetermined percent (e.g., 30%) from the highest interval in the histograms of the V-component, where the ratio of higher intervals and lower intervals in area becomes 3:7, if the histogram is calculated by area). The threshold Vthr differs from the predetermined value of V-component used for identifying the feature point. This is for setting an optimal threshold for each candidate. Note that, if the threshold Vthr becomes equal to or below the predetermined value (e.g., −5), the traffic sign correcting module 170 does not perform subsequent processing because the threshold can be considered to be an inappropriate threshold.

(3) As illustrated by arrows in FIG. 17B, the traffic sign correcting module 170 determines whether the V-component of each pixel is equal to or greater than the threshold Vthr from the center position of each candidate of the traffic sign, while shifting the detection pixel in the four horizontal and vertical directions. Then, if the pixels of which the V-component becomes equal to or greater than the threshold Vthr continues for a predetermined number (e.g., 3 pixels), the first detected pixel among the pixels of which the V-component becomes equal to or greater than the threshold Vthr is selected as an inner edge 348 of the red frame. Although the four horizontal and vertical directions are described herein as the detecting directions, they may be any four radial directions that intersect perpendicular to each other, without any limitation. Further, any other slanting directions, etc. with respect to the four directions may also be added to improve the detection accuracy.

(4) Next, the traffic sign correcting module 170 determines whether the position of the inner edge 348 of the red frame is within a predetermined range where it should originally be located. Particularly, for example, in a case where the detection is performed in the horizontally rightward direction, and assuming that the lateral coordinate of the center is J, the x-coordinate at the horizontal right end of the occupying area 346 is R, and the obtained coordinate of the inner edge 348 of the red frame is RE, the traffic sign correcting module 170 does not perform subsequent process because the coordinate RE of the inner edge 348 of the red frame is an inappropriate value, if the following Equations 3 is satisfied.

$$RE < (R-J) \times K + J \quad \text{(Equation 3)}$$

Here, K is a coefficient that takes any value of 0 to 1. For example, K is set to 0.6 upon the horizontal detection, and is set to 0.5 in the vertical detection. Further, (R−J)×K is a lower limit in the radial direction that the inner edge 348 can take (inner edge lower limit). This processing is a countermeasure for, for example, preventing that the inner edge 348 is erroneously taken due to the influence of the V-component, when the numerical value becomes orange in an electric light display type traffic sign.

(5) Next, the traffic sign correcting module 170 again derives the center position and the radius n of the image based on the position of each inner edge 348, when any traffic sign is adapted in all four horizontal and vertical directions. Particularly, the center position of the inner edges 348 in the horizontal directions can be determined, if the inner edge 348 located at the left is LE and the inner edge 348 located at the right is RE, by (LE+RE)/2, and the radius n can be determined by (RE−LE)/2. Further, the center position and the radius n can be determined by similar processing for the vertical inner edge 348. Thus, the occupying area 346 identified by the center position of the traffic sign is newly defined.

(6) Next, the traffic sign correcting module 170 compares, for the traffic sign, the radius n before the correction with the radius n after the correction, and, if a ratio of the radii is deviated from a predetermined range (e.g., equal to or greater than 0.75 times and less than 1.5 times), the traffic sign correcting module 170 does not perform subsequent processing because the ratio is an incongruent value.

(7) Finally, the traffic sign correcting module 170 resizes the occupying area 346 after the correction into a rectangular area of predetermined pixels in the horizontal directions× predetermined vertical pixels, and ends the correction processing concerned. Thus, it becomes possible to achieve the high recognition accuracy of the pattern matching by readjusting the center position and the radius of the traffic sign. Note that general approaches, such as the nearest neighbor algorithm can be used as the resizing.

Traffic Sign Content Recognition Processing S204

Figure 18:
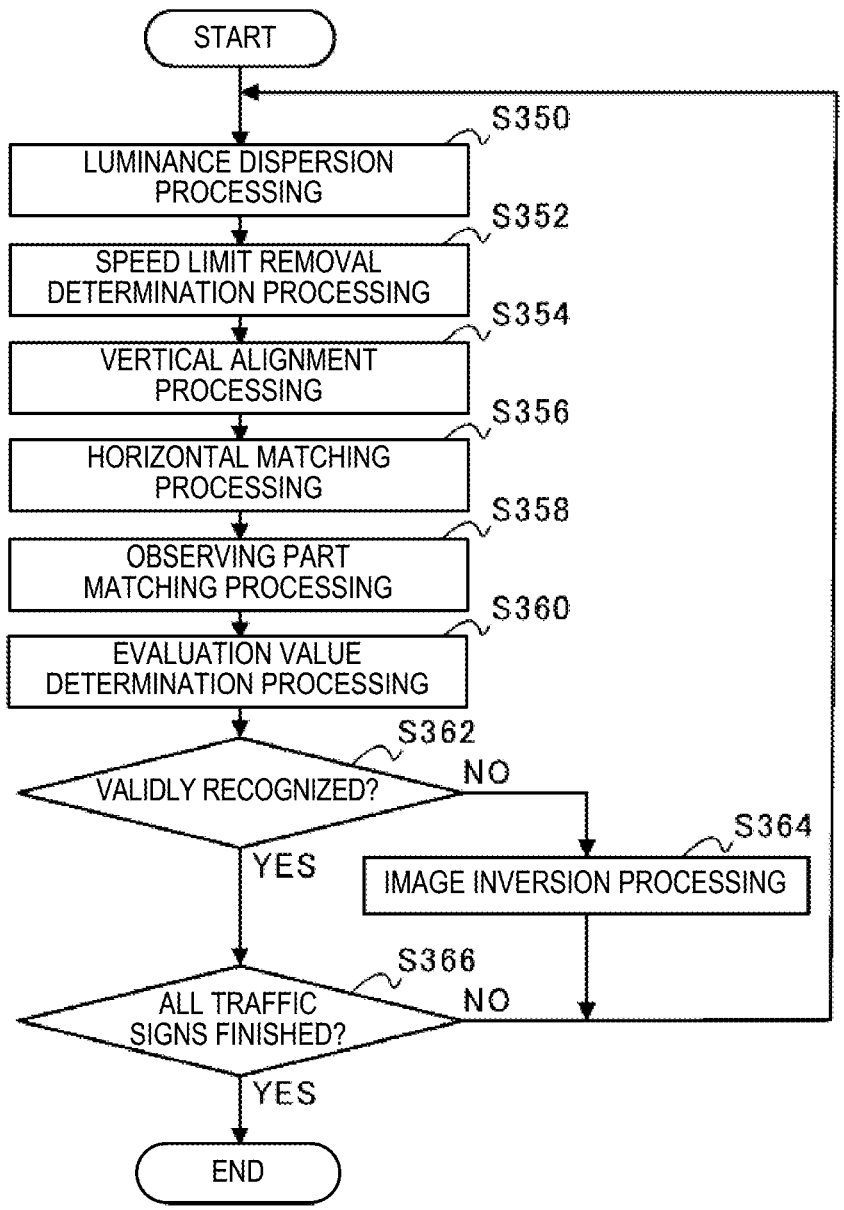
FIG. 18 is a flowchart illustrating a particular flow of traffic sign content recognition processing.

FIG. 18 is a flowchart illustrating a flow of particular processing of the traffic sign content recognition processing S204. The traffic sign content recognizing module 172 disperses, for the traffic sign corrected by the traffic sign correcting module 170, the luminance of the image corresponding to the occupying area 346 using the same image as the correction (S350), and determines whether this traffic sign is a traffic sign that presents a removal of a speed limit (S352). If the traffic sign is not a traffic sign that presents a removal of a speed limit, the traffic sign content recognizing module 172 determines the traffic sign to be a traffic sign that presents a speed limit and performs a vertical alignment of the traffic sign (S354), and then performs horizontal matching (S356). Next, the traffic sign content recognizing module 172 focuses on a predetermined part of the content of the traffic sign and performs the template matching of the observing part (S358), and derives an overall evaluation value and determines to which speed limit the observing part corresponds (S360).

Meanwhile, as described above, there are an electric light display type and a non-electric light display type of the traffic signs that are handled as the targets in this example. The electric light display type is higher in the luminance at the content of the traffic sign (e.g., numerical value part) than the circumference, and the non-electric light display type is lower in the luminance at the content of the traffic sign (e.g., numerical value part) than the circumference.

In the traffic sign content recognition processing S204, the recognition processing is performed assuming the possibility of both the indication types, since either one of the indication types has not yet been grasped. For example, the traffic sign content recognizing module 172 performs a series of processing of Steps S350-S360 using the image of the traffic sign as it is that is corrected by the traffic sign correcting module 170, and determines whether the content of the traffic sign is validly recognized (S362). As a result, if the traffic sign content recognizing module 172 determines that the content of the traffic sign is not validly recognized in any one of the processing of Steps S350-S360 (NO at S362), it inverts the luminances of the traffic sign corrected by the traffic sign correcting module 170 (S364), and again performs the series of processing of Steps S350-S360 for the traffic sign that is inverted in the luminance (inverted traffic sign).

If the traffic sign content recognizing module 172 determines that the content of the traffic sign is validly recognized in any of the processing of Steps S350-S360 (YES at S362), it transits the processing to Step S366, without inverting the traffic sign or without recognizing the content of the inverted traffic sign. Thus, either one of the traffic sign corrected by the traffic sign correcting module 170 and the inverted traffic sign can be recognized, and it becomes possible to appropriately recognize the content of the traffic sign, regardless of the difference in the indication type, such as the electric light display type and the non-electric light display type.

Alternatively, if the traffic sign content recognizing module 172 determines that the content of the traffic sign is not validly recognized in any one of processing of Steps S350-S360 before the inversion, it may interrupt the processing even during the middle of recognition processing, omit subsequent processing, and transit the processing to Step S362. Thus, unnecessary recognition processing can be avoided and the processing load can be reduced. Since the same processing is applied to the image after the correction and the image that is inverted in the luminance, only the image after the correction is described, and detailed description of the image that is inverted in the luminance is omitted for convenience of explanation.

Here, although the image that is inverted in the luminance is processed after processing of the image after the correction, this order may be reversed. For example, if a traffic sign that presents a speed limit is located at a road shoulder, according to the vehicle exterior environment, since the possibility that the traffic sign is a non-electric light display type is high, the image after the correction is first processed, and if the traffic sign is located at a gate, since the possibility that the traffic sign is an electric light display type is high, the image that is inverted in the luminance is first processed. Thus, since the image that is high in the possibility that the evaluation can be finished with a single loop of processing (Steps S350-S360) is first processed, the efficiency of the traffic sign content recognition processing S204 can be improved.

If the content of the traffic sign can be validly recognized from the image after the correction or the invert image that is inverted in the luminance (YES at S362), the traffic sign content recognizing module 172 determines whether such processing of Steps S350-S364 is executed to all the traffic signs corrected by the traffic sign correcting module 170 (S366). As a result, if all traffic signs have not been finished (NO at S366), the traffic sign content recognizing module 172 repeats the processing from Step S350 until it finishes (YES at S366). Next, the processing of Steps S350-S360 is described in detail.

Luminance Dispersion Processing S350

The traffic sign content recognizing module 172 disperses the luminance of each pixel over each occupying area 346 of the traffic signs corrected by the traffic sign correcting module 170. Thus, the image is converted into an image pattern that can be recognized without depending on the imaging state.

Figure 19:
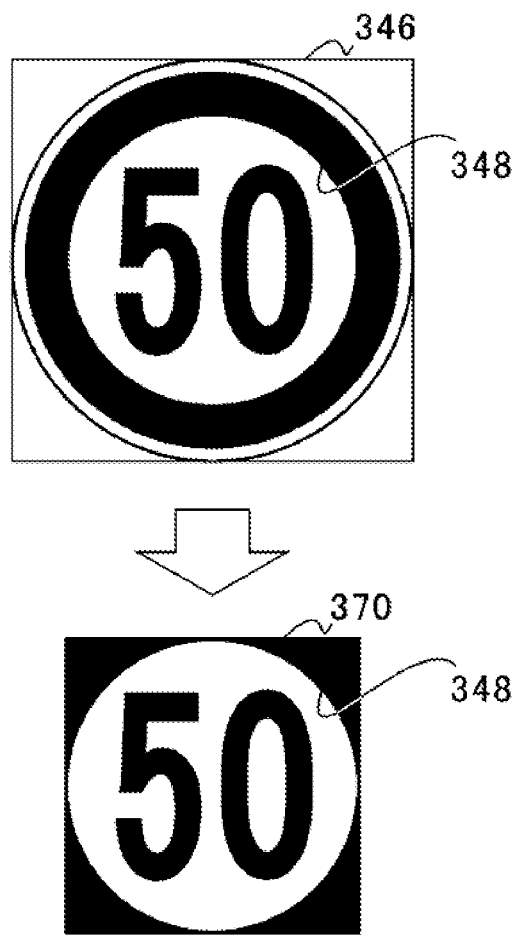
FIG. 19 is a diagram illustrating a recognition target area.

FIG. 19 is a diagram illustrating a recognition target area 370. First, the traffic sign content recognizing module 172 sets an area 370 to which recognition processing in the rectangular area of the predetermined pixels in the horizontal directions×predetermined vertical pixels is applied (hereinafter, referred to as "the recognition target area"). The recognition target area 370 is a rectangular area that contacts the inner edge 348 of the red frame in the occupying areas 346 illustrating in FIG. 19, and the following processing is applied to the recognition target area 370.

Next, the traffic sign content recognizing module 172 disperses each pixel of the recognition target area 370 to convert it into N-ary value. For example, if N=2, the luminance of each pixel has a value of either 0 or 255. Note that N is a value of 2 or greater. In this example, N=5 in order to reduce the effects to that pattern matching when the binarization does not work well due to the effects of the threshold settings, etc. In a case of quinary (5-ary), the number of thresholds of dispersion is four, and four predetermined percents (e.g., 20, 25, 35 and 40%) from the highest interval in the histogram of luminance are selected for the thresholds. These predetermined percents can be selected independently and arbitrarily.

With this configuration, the content of the traffic sign is appropriately recognized, regardless of the difference in distribution of the luminance value. Moreover, since the recognition is based on the values of the higher intervals in the histogram of luminance, quinarization can be appropriately performed regardless of the distribution state of the luminance in each recognition target area 370 and, thus, normalization can also be achieved in addition to the dispersion.

Speed Limit Removal Determination Processing
S352

Although the traffic sign content recognizing module 172 performs, for the quinarized recognition target area 370, the recognition processing corresponding to either one of the traffic sign that presents a speed limit and the traffic sign that presents a removal of the speed limit, since the former case can make the processing load smaller, the traffic sign content recognizing module 172 first processes on the assumption that it is the former case, and if it is not the former case, the traffic sign content recognizing module 172 then processes for the latter case. Thus, it can be avoided to unnecessarily perform the recognition processing of the traffic sign that presents the speed limit.

Figure 20:
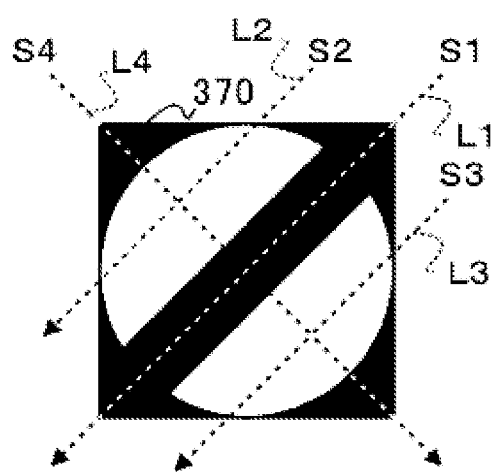
FIG. 20 is a diagram illustrating a traffic sign that presents a removal of a speed limit.

FIG. 20 is a diagram illustrating the traffic sign that presents a removal of the speed limit. The traffic sign content recognizing module 172 integrates luminances of a plurality of pixels corresponding to four line segments L1, L2, L3, and L4 that cross in the recognition target area 370 illustrated in FIG. 20 and that have an angle of inclination (inclined) to obtain integrated luminance values S1, S2, S3, and S4 of the line segments L1, L2, L3, and L4, respectively. The angle of inclination of the line segment is an angle that corresponds to the indication type of the traffic sign that presents a removal of the speed limit. Here, the thresholds for determining the integrated luminance values S1, S2, S3, and S4 are TS1, TS2, TS3, and TS4, respectively. Note that TS4 is comprised of two thresholds TS4$a$ and TS4$b$ having a relation of TS4$a$<TS4$b$. Alternatively, a relation of TS2=TS3 may also be adopted. The traffic sign content recognizing module 172 recognizes the traffic sign concerned to be a traffic sign that presents a removal of the speed limit based on the following Equation 4 that quantifies the difference in the intensity of the four line segments L1, L2, L3, and L4, when satisfying all of Equation 4.

$$S1<TS1$$

$$S2>TS2$$

$$S3>TS3$$

$$TS4a<S4<TS4b \qquad \text{(Equation 4)}$$

Here, since the deviations in the luminance due to the positional offset and the brightness are corrected, the content of the traffic sign can be recognized by very simple processing like Equation 4 described above.

Vertical Alignment Processing S354

If the traffic sign is not determined to be a traffic sign that presents a removal of the speed limit by the above-described processing, it is determined to be a traffic sign that presents the speed limit. The traffic sign content recognizing module 172 first performs a vertical alignment of a numerical area where the numerical values occupy within the recognition target area 370. This is because the recognition target area 370 may include a very small positional offset or may differ in the size and the shape of the numerical value, and the distance between the numerical values, etc. depending on country or installation style in the country.

Figure 21:
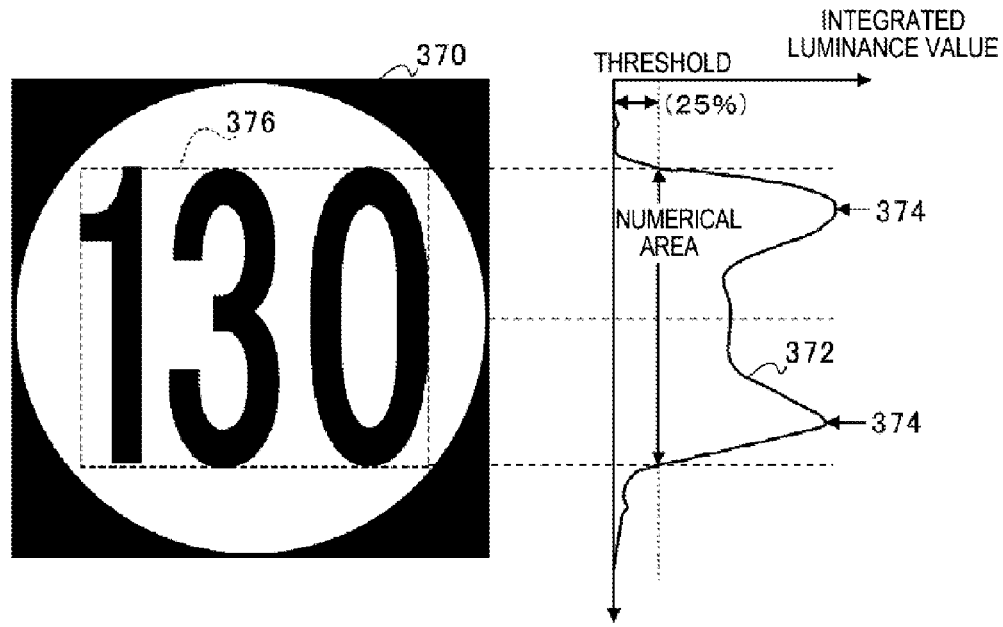
FIG. 21 is a diagram illustrating vertical alignment processing.

FIG. 21 is a diagram illustrating the vertical alignment processing. As illustrated in FIG. 21, the traffic sign content recognizing module 172 horizontally integrates luminances of the pixels in the recognition target area 370, develops the integrated luminance values in the vertical directions to generate a vertical luminance distribution 372. Note that, in the case of the traffic sign illustrated in FIG. 21, since the numeric part is lower in the luminance than other part around the numeric part, the integrated luminance values are calculated after inverting the luminances in the luminance distribution 372 of FIG. 21 in order to extract the numeric part. Next, the traffic sign content recognizing module 172 calculates maximum values 374 of the integrated luminance values on both vertically upper and lower sides from the center part of the recognition target area 370, uses a predetermined percent (e.g., 25%) of each maximum value as a threshold to shift the detection pixel vertically upward and downward from the center part, respectively, and if the pixels of that the integrated luminance value is less than the threshold continue for a predetermined number (e.g., 2 times), this location is selected as an upper end or a lower end of the numerical area 376.

Next, the traffic sign content recognizing module 172 uses the upper end and the lower end of the numerical area 376 that are thus derived to normalize the vertical size of the numerical area 376 by expanding or contracting the vertical size. For example, if a distance between the upper end and the lower end of the numerical area 376 is HI, and a vertical distance of a template is HT, the traffic sign content recognizing module 172 vertically multiplies the numerical area 376 by HT/HI times. Thus, the size of the numerical area 376 can be conformed to the vertical size of the template that is used for the matching afterwards. Note that the correction is performed by the nearest neighbor algorithm.

Although noise is generated in the integrated luminance value, for example, in the downward direction of FIG. 21 by such processing, the effects can be eliminated and the normalized numerical area 376 can be extracted appropriately.

Horizontal Matching Processing S356

Figure 22:
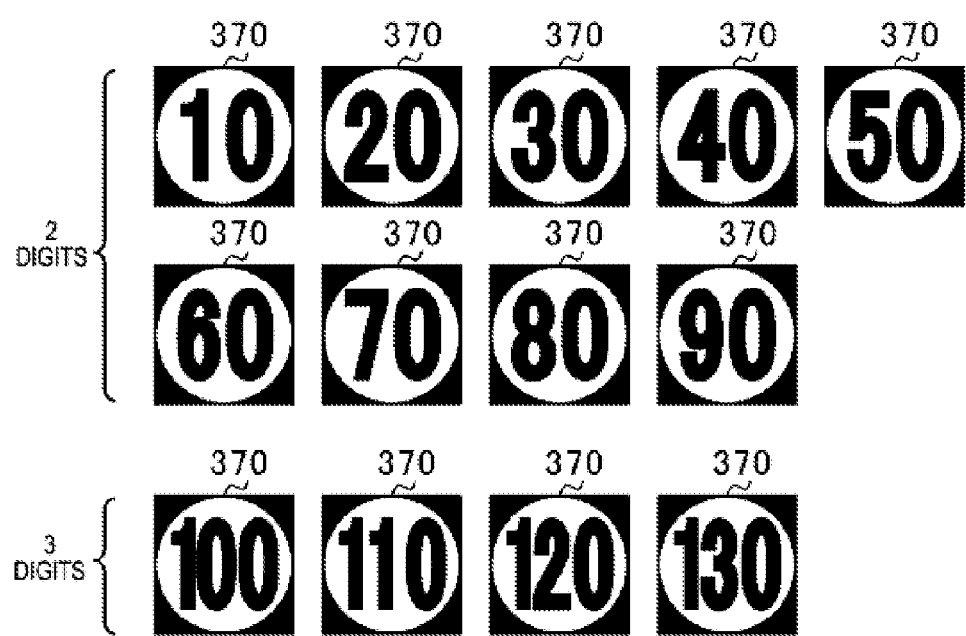
FIG. 22 is a diagram illustrating templates.

FIG. 22 is a diagram illustrating the template. The traffic sign content recognizing module 172 recognizes the content of the recognition target area 370 (i.e., the numerical value) that is aligned vertically. This recognition is performed by matching with the templates prepared in advance. As illustrated in FIG. 22, 13 kinds of templates, such as 10 to 90 (two digits) and 100 to 130 (three digits), are prepared by a pitch of 10, for example.

Figure 23:
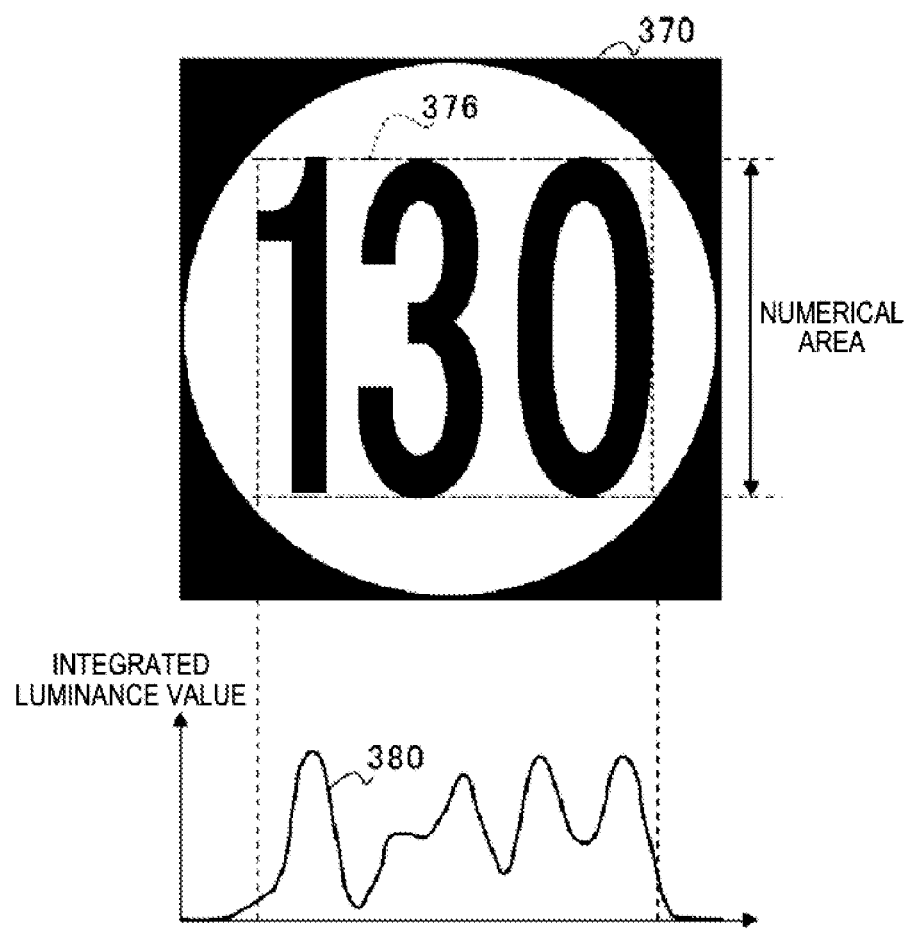
FIG. 23 is a diagram illustrating horizontal matching processing.

FIG. 23 is a diagram illustrating horizontal matching processing. The traffic sign content recognizing module 172 vertically integrates the pixels in the vertically-normalized recognition target area 370 as illustrated in FIG. 23, it horizontally develops the integrated luminance values to generate a horizontal luminance distribution 380. Thus, the two-dimensional image is lowered to one dimension. Note that, similar to the vertical alignment, since the numeric part is low in the luminance, the integrated luminance value is calculated after inverting the luminances in the luminance distribution 380 of FIG. 23 in order to extract the numeric part. Further, the vertical integrating range is only a range from the upper end to the lower end of the numerical area 376 derived by the vertical alignment. Therefore, an integration of the luminances of the unnecessary areas other than the vertical numerical area can be avoided. The traffic sign content recognizing module 172 carries out DP matching of the luminance distribution 380 in FIG. 23 that is derived as described above with luminance distributions based on the templates to calculate a correlation evaluation value with each template (here, the correlation is higher as the correlation evaluation value becomes lower).

Here, similar to the vertical alignment, since there are the differences, for example, in the size of the numerical value and the differences in the interval between the numerical values (i.e., the size of the gap), sufficient performance cannot be obtained if the templates of a fixed size is used. Therefore, the DP matching in which horizontal expansion and contraction are permitted is used. Although it is theoretically possible to perform the DP matching in two dimensions, since necessary throughput becomes significantly high, one-dimensional DP matching is used in this example.

Figure 24:
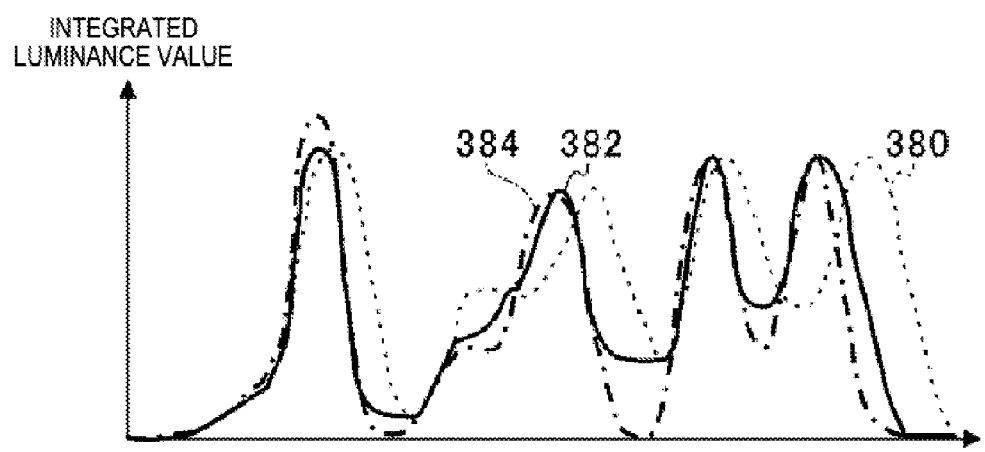
FIG. 24 is a chart illustrating DP matching.

FIG. 24 is a chart illustrating the DP matching. The traffic sign content recognizing module 172 performs the DP matching with, for example, a template of "130," and obtains the result as illustrated in FIG. 24. Here, a dashed line illustrates the luminance distribution 380 of the recognition target area 370 before the DP matching, a solid line illustrates a luminance distribution 382 of the recognition target area 370 after the DP matching, and a dashed dotted line illustrates a luminance distribution 384 of the template. The DP matching is to perform matching while expanding and contracting the luminance distribution 380 of the recognition target area 370 so that the size of the luminance distribution 380 becomes the same size as that of the luminance distribution 384 of the template. Therefore, as understood from FIG. 24, the correlation of the luminance distribution 380 of the recognition target area 370 before expansion and contraction with the luminance distribution 384 of the template is low, but the correlation of the luminance distribution 382 of the recognition target area 370 after expansion and contraction with the luminance distribution 384 of the template becomes high.

Note that, here, all the correlation evaluation values of the luminance distribution 382 of the recognition target area 370 after expansion and contraction with the luminance distribution 384 of the plurality of templates are calculated, regardless of the correlation evaluation values. Particularly, if the luminance distribution 382 of the recognition target area 370 after expansion and contraction is im, and the numerical value (speed limit) of the template is T, the traffic sign content recognizing module 172 sequentially derives DP(im, T) that is a correlation evaluation value (sum of squares of difference) after expansion and contraction, from DP(im, 10) to DP(im, 130).

Note that subsequent processing is not performed for candidates that are clearly different from the templates. For example, the luminance distribution 382 of the recognition target area 370 is "130," and "10" to "90" of two digits differ in the digit count in the first place. Therefore, DP(im, 10) to DP(im, 90) corresponding to "10" to "90" are low in the correlation. Accordingly, the following processing is omitted for templates of that the value of DP(im, T) exceeds the threshold (low correlation).

Observing Part Matching Processing S358

Here, although the correlation evaluation value DP(im, T) is calculated regardless of the digit count of the numerical value, it is not wise to perform the matching with all the numerical values of the second digit and the third digit when the tendency of the change in numerical value is known in advance like this example. This is because, for example, the first digit part of "0" is common for all the numerical values of "10" to "90," and the first digit part of "0" and the third digit part of "1" are common for "100" to "130." Therefore, since all the numerical values of the common part are identical, it is difficult to cause differences in the correlation evaluation value if the matching is performed for all the digits.

Therefore, the traffic sign content recognizing module 172 calculates the correlation evaluation values DP(im, T) as described above, and performs the matching only at the second digits where a difference in the shape of the numerical value is caused. Note that, since the luminance distribution 382 of the recognition target area 370 is expanded and contracted horizontally, it must derive that part of the luminance distribution 382 of the recognition target area 370 is identical to which part of the luminance distribution 384 of the template. Therefore, the traffic sign content recognizing module 172 derives horizontal coordinates DPR(im, T) that correspond to horizontal coordinates TS(T) at the starting position of the second digit of the template, and that correspond to the starting position of the second digit of the luminance distribution 382 of the recognition target area 370. The horizontal coordinates can be calculated based on the history of processing that links up the feature points in the DP matching. Particularly, the information on the combination of feature points (e.g., route) is stored in advance, and the horizontal coordinates are derived by calculating it backward. With this configuration, the horizontal coordinates can be efficiently calculated using the result of the DP matching still in progress. Since particular procedures of such DP matching have already been disclosed in various technical literatures, the detailed description thereof is omitted herein.

Figure 25:
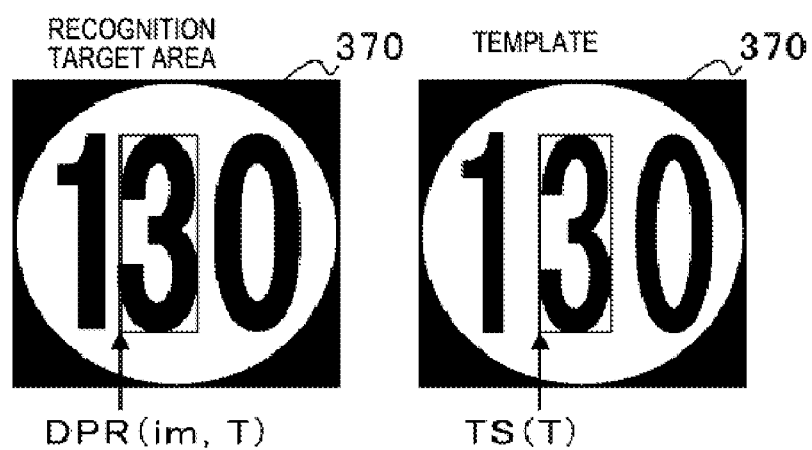
FIG. 25 is a diagram illustrating matching processing of an observing part.

FIG. 25 is a diagram illustrating the matching processing of the observing part. When the horizontal coordinates corresponding to the starting position of the numerical area at the second digit can be found as described above, the traffic sign content recognizing module 172 performs simple template matching. Although any index may be used for the template matching, the Sum of Absolute Difference (SAD) may be used, for example. A target range of the matching is, as illustrated in the example of "130" of FIG. 25, part having a horizontal length of the numerical value at the second digit of the template, based on the horizontal coordinates DPR (im, T) corresponding to the starting position of the luminance distribution 382 of the recognition target area 370, and the horizontal coordinates TS(T) corresponding to the starting position at the second digit of the template. Here, since the horizontal alignment has already been performed, the processing load can be significantly reduced, without necessity of processing, such as an optimum value search by positional offset matching.

Note that, for example, since, the horizontal length (lateral width of the numerical value) differs between a two-digit numerical value and a three-digit numerical value, the result of matching may be affected by the difference in the lateral width of the numerical value. Thus, the traffic sign content recognizing module 172 multiplies a correlation evaluation value TM(im, T) of the DP matching at the second digit by a normalization coefficient defined in advance for each template, according to a ratio of the lateral width of the recognition target area 370 of the numerical value with more digits and the lateral width of the recognition target area 370 of the numerical value with less digits. For example, if the ratio of the lateral width of the numerical value of two digits against the numerical value of three digits is 3:2, the traffic sign content recognizing module 172 derives the correlation evaluation values TM(im, T) at the second digit of "100" to "130," and then multiplies these values by 3/2 to replace TM(im, T) with the results of the multiplication. Thus, an appropriate evaluation can be performed regardless of the number of digits.

Evaluation Value Determination Processing S360

Next, the traffic sign content recognizing module 172 derives an overall evaluation value E(im, T) for each template by the following Equations 5 and 6 using the correlation evaluation value DP(im, T) calculated for each template and the correlation evaluation value TM(im, T) at the second digit.

Overall evaluation value $E(im, T)=DP(im, T)\times TM(im, T)/F(im)$ (Equation 5)

$F(im)=\max(\min(TM(im, T)), th)$ (Equation 6)

Here, since the correlation of the entire numerical value is expressed by DP(im, T), a partial correlation at the second digit is expressed by comparisons with other templates by using the same value of the correlation (i.e., TM(im, T)/F (im)). Here, although F(im) is a minimum value min(TM (im, T)) of the correlation evaluation value, since the overall evaluation value E(im, T) may be diverged if the value of min(TM(im, T)) becomes too small, the predetermined value th is adopted as F(im) when min(TM(im, T)) becomes less than the value th.

Figure 26:
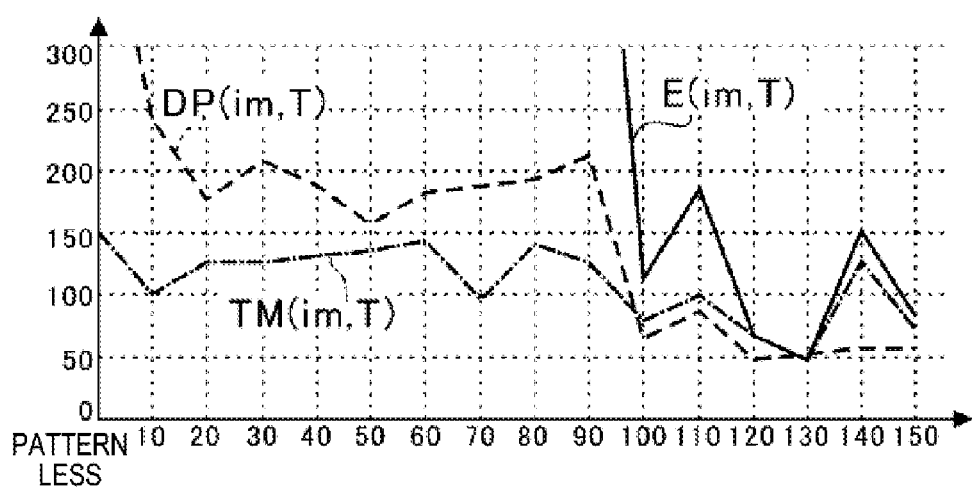
FIG. 26 is a diagram illustrating evaluation results.

FIG. 26 is a diagram illustrating evaluation results. Here, a dashed line illustrates the correlation evaluation value DP(im, T), a dashed dotted line illustrates the correlation evaluation value at the second digit, TM(im, T), and a solid line illustrates the overall evaluation value E(im, T). As referring to FIG. 26, although the differences between the original numerical value and other numerical values are small in the matching at all the digits of the numerical value for "100" to "130," since the matching only at the second digit is added, it can be understood that the overall evaluation value E(im, T) of the matching with the template of "130" that is the actual numerical value is the minimum (i.e., the correlation is the maximum). Note that, for facilitating the description, FIG. 26 also illustrates templates for which the calculation is originally omitted, and illustrates templates up to "150."

Thus, since two steps of matching are carried out (matching at all the digits of the numerical value and matching only at the second digit), the accuracy can be improved and the processing time can be reduced.

Traffic Sign Content Determining Processing S206

In the above, the content of the traffic sign is recognized. However, as described above, it is not necessary to recognize a traffic sign at the moment of arriving the position where the traffic sign can be confirmed ahead of the vehicle, but it is sufficient to recognize when or after the vehicle passes the traffic sign. Therefore, it is sufficient to recognize the traffic sign over a plurality of frames, and to conclusively determine the content of the traffic sign based on the information of the plurality of frames. Thus, the traffic sign content determining module 174 integrates with time the contents of the traffic sign that is recognized in one frame to conclusively determine the traffic sign.

Here, in order to conclusively determine the content of the traffic sign, four variables of a traffic sign integration point, a speed limit candidate, a traffic sign non-detection time period, and a speed limit output are used. Here, the traffic sign integration point is prepared for each of one or more candidates of the traffic sign, and indicates a point according to the various evaluation values (E(im, T), DP(im, T), and TM(im, T)) in the traffic sign content recognition processing S204. The speed limit candidate indicates one candidate of a speed limit. The traffic sign non-detection time period indicates a continuous time during which any traffic sign is not detected. The speed limit output is used for a latch of the speed limit candidate. When the speed limit output is updated by the speed limit candidate, a value is held as the speed limit output, and the value is informed to the vehicle operator or it is used as a control input of the vehicle control device 130 during the value being held.

The traffic sign content determining module 174 integrates the traffic sign integration points according to the conditions of the following (1) to (4) using the various evaluation values (E(im, T), DP(im, T), and TM(im, T)) derived by the traffic sign content recognizing module 172, by which the probability of the speed limit is evaluated.

(1) If E(im, T)<ETHR1 & DP(im, T)<DTHR1 & TM(im, T)<TTHR1, add +4 points;
(2) If the condition (1) is not satisfied and if E(im, T)<ETHR2 & DP(im, T)<DTHR2 & TM(im, T)<TTHR2, add +2 points, (here, ETHR1<ETHR2, DTHR1<DTHR2, TTHR1<TTHR2);
(3) Among the templates that satisfy the condition (1), if a difference between the minimum value EM of E(im, T), and E(im, T) of all other templates is equal to or greater than a predetermined value, add +2 points to the template of the minimum value EM; and
(4) Among the templates that satisfy the condition (1), if a difference between the minimum value EM of E(im, T), and E(im, T) of other one or more templates that are equal to or less than a predetermined value (ETHR3), add +1 point to all the templates that are equal to or less than the predetermined value.

Thus, fundamental points are added according to the conditions (1) and (2), and points based on the comparison with other templates are added according to the conditions (3) and (4).

For example, in the example of FIG. 26, suppose that the conditions (1) to (4) are ETHR1=80, ETHR2=100, ETHR3=5, DTHR1=80, DTHR2=100, TTHR1=100, and TTHR2=150, "120" and "130" are given +4 point based on the condition (1), "100" and "150" are given +2 points based on the condition (2), and "130" is given +2 point based on the condition (3). Putting this together, "130" is 6 points, "120" is 4 point, "100" and "150" are 2 points, and other numerical values are 0 point. Note that, if recognized as the traffic sign that presents the speed limit in the speed limit removal determination processing, it is given uniformly 6 points.

The traffic sign content determining module 174 integrates the contents of the traffic sign with time based on the traffic sign integration points that are calculated as described above, and then performs a final output, as follows.

Figure 27:
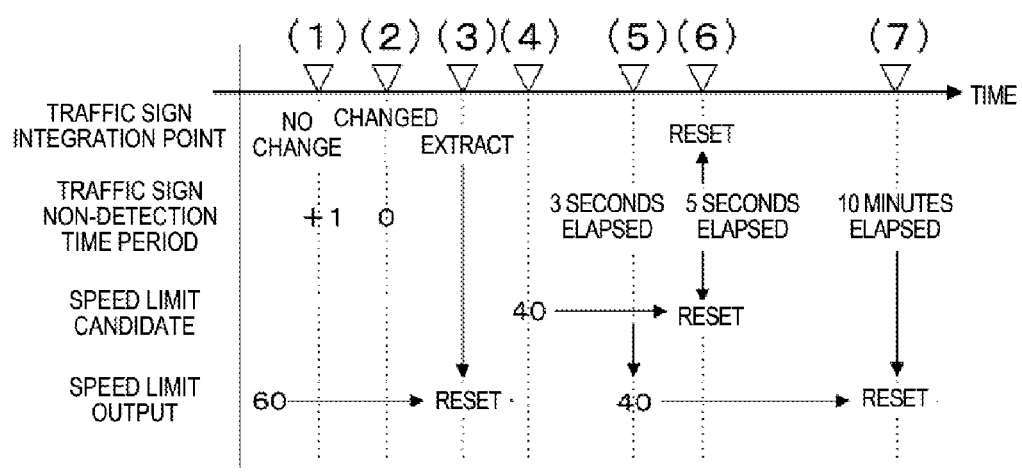
FIG. 27 is a time chart illustrating a flow of a result notification of a traffic sign.
Figure 28A:
FIGS. 28A to 28D are diagrams illustrating indication types of traffic signs by country.
Figure 28B:
Figure 28C:
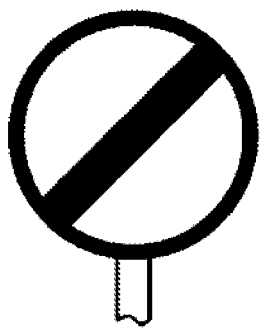
Figure 28D:
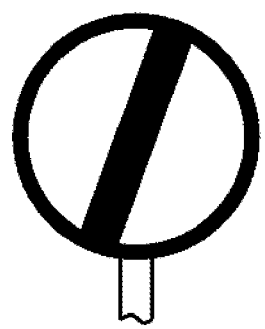

FIG. 27 is a time chart illustrating a flow of result notification of the traffic sign. The traffic sign content determining module 174 always integrates the traffic sign integration points to all the candidates of the detected traffic sign for each frame. Then, the traffic sign content determining module 174 compares the traffic sign integration point of the current frame with the traffic sign integration point of the previous frame, and if the point does not change, the traffic sign content determining module 174 increments the traffic sign non-detection time period because a traffic sign is not detected in the current frame, as illustrated in FIG. 27 (1). On the other hand, if the point changes, the traffic sign content determining module 174 resets the traffic sign non-detection time period to 0 because a traffic sign is detected in the current frame, as illustrated in FIG. 27 (2).

Further, if the traffic sign is detected in the current frame, the traffic sign content determining module 174 extracts the highest and the second highest traffic sign integration points of two traffic sign candidates from the plurality of traffic sign candidates, and speed limits respectively recognized, as illustrated in FIG. 27 (3). Since it is conclusively determined at this time that the speed limit output is to be newly updated, the currently-held speed limit output is reset. Therefore, the notification of the speed limit is not performed. Thus, the unnecessary continuous notification of the previous speed limit can be avoided.

In a case where the maximum value of the traffic sign integration point exceeds the predetermined value (e.g., 8 points), the traffic sign content determining module 174 updates the speed limit candidate with the speed limit (e.g., 40) of the traffic sign of which the traffic sign integration point is the maximum value as illustrated in FIG. 27 (4) (i.e., it conclusively determines to be the output candidate) if the difference with the second largest traffic sign integration point is equal to or greater than the predetermined value (e.g., 4 points). Thus, the candidate of the speed limit is extracted. If less than the predetermined value, the speed limit candidate is updated to "Undetermined." If the maximum value of the traffic sign integration point is equal to or less than the predetermined value, the speed limit candidate is not updated. Therefore, the speed limit candidate maintains "No Candidate."

After there is no more change in the traffic sign integration point (the vehicle passed the traffic sign), the traffic sign content determining module 174 determines whether the speed limit candidate exists as illustrated in FIG. 27 (5) if the traffic sign non-detection time period elapses an output time period setting (e.g., 3 seconds). On the other hand, if the speed limit candidate exists, the traffic sign content determining module 174 updates the speed limit output by the speed limit candidate (e.g., 40) to resume the notification of the speed limit. Thus, the noise input of the content of the traffic sign can be eliminated.

Next, after there is no more change in the traffic sign integration point, the traffic sign content determining module 174 resets the traffic sign integration point and the speed limit candidate in order to prepare for the next traffic sign as illustrated in FIG. 27 (6) if the traffic sign non-detection time period elapses a reset time period (e.g., 5 seconds) that is longer than the output time period setting. Thus, a recognition of the new traffic sign is prepared.

Next, after there is no more change in the traffic sign integration point, the traffic sign content determining module 174 resets the speed limit output as illustrated in FIG. 27 (7) if the traffic sign non-detection time period elapses a notification maximum time period (e.g., 10 minutes). Thus, the unnecessary continuous notification of the previous speed limit can be avoided.

If the vehicle 1 is determined to be during a left turn or a right turn (e.g., the absolute value of the steering angle exceeds 360°), the traffic sign content determining module 174 resets all the traffic sign integration point, the speed limit candidate, and the speed limit output. This is because, when the vehicle 1 turns to the left or to the right, the road where the vehicle travels is changed, and the speed limit of the previously-traveling road is no longer applicable.

With such a configuration, the traffic sign content determining module 174 can notify the speed limit after 3 seconds from the passing of the traffic sign, and maintain the speed limit until the lapse of 10 minutes, the right turn or left turn, or other traffic signs are detected. Moreover, the noise input of the content of the traffic sign can be eliminated, and the identification accuracy of the content of the traffic sign can be improved.

In order to further improve the practicability, the following processing may also be performed additionally. For example, when there are a plurality of lanes for the vehicle, the traffic signs disposed at a gate may present different speed limits for each lane. In this example, since the number of the traffic signs to be recognized is limited to three or less, the traffic sign integration point exists for each of the different traffic signs when the speed limits differ for each lane as described above. If only the correct speed limits are integrated for each traffic sign, the traffic sign integration point will be, for example, 6 points, for any of the speed limits. In such a case, the speed limit candidates will then be updated by "Undetermined" in the determination described above, regardless of the points are appropriately accumulated.

Thus, in this example, if a plurality of candidates of the traffic sign of which the traffic sign integration points are significant values exist simultaneously in one frame, the traffic sign content determining module 174 derives each horizontal distance x, and if the horizontal distance x of any one of the traffic signs is less than a threshold (e.g., 3 m) and other traffic signs are equal to or greater than the threshold, the traffic sign content determining module 174 adds 1 point to the one traffic sign and subtracts 1 point from other traffic signs. Thus, the speed limit of the traffic sign that is nearest to the vehicle 1 can be preferentially selected as the speed limit candidate.

Difference in Traffic Sign by Country

FIGS. 28A to 28D are diagrams illustrating indication types of the traffic sign by country. As can be seen from the comparison between a German traffic sign that presents a speed limit in FIG. 28A and a Swiss traffic sign that presents a speed limit in FIG. 28B, the traffic signs that present a speed limit may differ by country in the size and the shape of the numerical value, and the distance between the numerical values. Further, as can be seen from the comparison between a German traffic sign that presents a removal of a speed limit in FIG. 28C and a Italian traffic sign that presents a removal of a speed limit in FIG. 28D, the traffic signs may differ in the angle of the slash.

Therefore, the traffic sign content determining module 174 determines to that country's traffic sign the speed limit candidate belongs, in parallel to the integration of the contents of the traffic sign with time for the conclusive determination as described above. Then, the traffic sign content determining module 174 correctly grasps the country where the vehicle is currently traveling, and appropriately recognizes, for example, the speed limit by using the templates of the country concerned.

FIG. 29 is a table illustrating the templates of the traffic signs. Country determination processing is fundamentally performed using the templates by country. Therefore, as illustrated in FIG. 29, the templates that are two-dimensionally arrayed by country (Country A to Country Z) and by speed limit ("10" to "150") are prepared. Note that the traffic signs that present a removal of the speed limit are not held as the templates, but angle information of the slashes is held instead of the templates. Further, information, such as the radii n for the traffic sign detection processing S202, and the N-ary thresholds (predetermined percents) for the traffic sign content recognition processing S204 are also held by country.

Here, if the vehicle exterior environment recognition system 100 concerned is interlocked with a navigation system, the templates may be switched according to the current country information obtained from the navigation system; however, if the vehicle exterior environment recognition system 100 is not interlocked with the navigation system, the country determination is performed by the following procedures.

Note that the country determination processing is low in the requirement for real-time processing. Therefore, when the image of the recognition target area is once acquired, the image is temporarily held in a temporary image memory, and the country determination processing is performed over two or more frames during an idle time after the vehicle exterior environment recognition processing for each frame is finished. Here, in order to determine the country, a total point by country that is prepared for each one or more candidates of one country is used as a variable. The traffic sign content determining module 174 initializes the temporary image memory area and the total point by country at a predetermined timing.

In the country determination processing, the traffic sign content determining module 174 determines whether the country determination processing has already been performed for the current frame. As a result, if the country determination processing has already been performed, the traffic sign content determining module 174 continues the current processing, and if the previous country determination processing is finished, the traffic sign content determining module 174 starts new country determination processing. As described above, since the country determination processing is performed in the idle time, when a predetermined processing time period of the current frame is reached in the middle of the current processing, the traffic sign content determining module 174 suspends the current processing, and will continue the rest of the processing in the subsequent frame.

Next, the traffic sign content determining module 174 determines whether only one speed limit has obtained the traffic sign integration point (also including the case where the points have been obtained for a plurality of traffic signs) in one or more candidates of the traffic sign in the traffic sign content determining processing S206 described above for the current frame. As a result, if a traffic sign is not detected, or if only the speed limit of one traffic sign has not obtained the traffic sign integration point, such as the points have been obtained for the plurality of speed limits for the plurality of traffic signs, the traffic sign content determining module 174 ends the processing of the current frame and repeats the determination of the traffic sign integration point in the subsequent frame.

Next, if only one speed limit has obtained the traffic sign integration point, the traffic sign content determining module 174 determines the recognition result of the speed limit to be a speed limit V, and then stores the image of the recognition target area 370 in the temporary image memory. Here, if the speed limit V has obtained the traffic sign integration point for all the plurality of traffic signs that are candidates, the traffic sign content determining module 174 stores the image of the recognition target area 370 of a candidate of which the overall evaluation value E(im, V) is lowest (maximum correlation). Here, the image stored is the occupying area 346 that is normalized in the rectangular area of the predetermined horizontal pixels×the predetermined vertical pixels after the completion of the traffic sign detection processing S202.

Next, the traffic sign content determining module 174 performs the traffic sign content recognition processing S204 for the templates of the speed limit V of each country based on the image of the occupying area stored in the image memory. That is, the traffic sign content recognition processing S204 described above uses templates of every speed limit T of one country as illustrated by a dashed line in the table of FIG. 29; however, the templates of every country of one speed limit V are used in this example as illustrated by a solid line in the table of FIG. 29. Therefore, if an identifier of the country is CN and a speed limit is V, the overall evaluation value E(CN, V) is derived instead of the overall evaluation value E(im, T). The evaluation values E(CN, V) for all the countries for which the templates are prepared can be acquired in this processing.

Note that weighting is varied in the evaluation value E(CN, V) between the currently-recognized country and other countries in this example. For example, the traffic sign content determining module 174 multiplies only the evaluation value E(CN, V) of the currently-recognized country by a weighting coefficient (e.g., 0.8 that is equal to or less than 1). This is for relatively lowering the evaluation value E(CN, V) of the currently-recognized country (increasing the correlation) and avoiding hunching from causing in the result of the country determination. Alternatively, if a country adjacent to the currently-recognized country can be grasped, the weighting coefficient (e.g., 0.95 that is equal to or greater than 0.8, and equal to or less than 1) may also be multiplied for the adjacent country.

The traffic sign content determining module 174 compares the evaluation values E(CN, V) for all the countries thus derived to derive a minimum value ECM. If differences between the minimum value ECM and the evaluation values E(CN, V) of all other templates are equal to or greater than a predetermined value, +1 is added to the corresponding total points by country of the template of the minimum value ECM.

Next, the traffic sign content determining module 174 compares the maximum value of the total points by country with all other total points by country, and if the differences are equal to or greater than a predetermined value (e.g., 30), the traffic sign content determining module 174 determines whether the country with the maximum value is identical to the currently-recognized country. As a result, if the country with the maximum value is identical to the currently-recognized country, the traffic sign content determining module 174 multiplies all the total points by country by ½ to lower all the traffic sign integration points for fair judgment. If the country with the maximum value differs from the currently-recognized country, the traffic sign content determining module 174 determines that the country where the vehicle is traveling has been changed, updates the currently-recognized country by the country with the maximum value, and initializes the temporary image memory area and the total points by country. If the difference between the maximum value of the total points by country and all other total points by country are less than a predetermined value, the traffic sign content determining module 174 initializes the temporary image memory area, and repeats the determination of the traffic sign integration point concerned in the subsequent frame.

Thus, the identification accuracy of the content of the traffic sign can be improved by appropriately determining the currently-traveling country. Further, the processing load can be lowered by performing the country determination processing described above in the background of the recognition processing of the traffic sign of one country.

As described above, the vehicle exterior environment recognition device 120 of this example is possible to improve the recognition accuracy of the content of the traffic sign, while reducing the processing load.

The vehicle exterior environment recognition device 120 may be provided as one or more computer-readable programs that can function one or more computers as the vehicle exterior environment recognition device 120, or may be provided as one ore more storage media that record the computer-readable program(s), such as one ore more flexible disks, magneto-optic discs, ROMs, CDs, DVDs, and BDs. The term "program" as used herein refers to a data set that is described in any language and/or any describing method.

Although the suitable example of the present disclosure is described above with reference to the accompanying drawings, it cannot be overemphasized that the present disclosure is not limited to this example. It is apparent to a person skilled in the art that various kinds of changes and/or modifications are possible without departing from the scope of the appended claims, and it should be understood that those changes and/or modifications naturally belong to the technical scope of the present disclosure.

Note that the processes of the vehicle exterior environment recognition processing described herein are not necessarily processed in the order indicated in the flowcharts, and they may be parallelly processed or may be processed by subroutine(s).

The present disclosure can be used for the vehicle exterior environment recognition device that recognizes the content of the traffic sign installed on the road.

The invention claimed is:

1. A vehicle exterior environment recognition device, comprising:
    an image acquiring module that acquires an image;
    a traffic sign identifying module that identifies a circle of a predetermined radius centering on any one of pixels in the image as a traffic sign;
    a traffic sign content recognizing module that recognizes content of the identified traffic sign; and
    a traffic sign content determining module that uses templates for one certain country that respectively correspond to contents of traffic signs and determines one content that has a highest correlation with the content of the identified traffic sign, and uses a template for each of a plurality of countries having a highest correlation with the content of the identified traffic sign, and conclusively determines one country that has a highest correlation with the content of the identified traffic sign.

2. A vehicle exterior environment recognition device, comprising:

an image acquiring module that acquires an image;

a traffic sign identifying module that identifies a circle of a predetermined radius centering on any one of pixels in the image as a traffic sign;

a traffic sign content recognizing module that recognizes content of the identified traffic sign; and a traffic sign content determining module that uses templates for one certain country that respectively correspond to contents of traffic signs and determines one content that has a highest correlation with the content of the identified traffic sign and uses a template for each of a plurality of countries having a highest correlation with the content of the identified traffic sign, and conclusively determines one country that has a highest correlation with the content of the identified traffic sign, wherein the traffic sign content determining module applies weighting to each of a currently-recognized country and a country adjacent to the currently-recognized country so that the currently-recognized country and the country adjacent to the currently-recognized country are easily selected.

3. The vehicle exterior environment recognition device of claim 1, wherein the traffic sign content determining module stores images that are determined to be the identified traffic sign in an image memory, and uses a template corresponding to the content of the identified traffic sign for each of the plurality of countries to determine conclusively determines the one country which has the highest correlation, during an idle time of the processing that uses the templates for the one certain country which respectively correspond to the contents of the traffic signs and determines the one content which has the highest correlation with the content of the identified traffic sign.

4. The vehicle exterior environment recognition device of claim 2, wherein the traffic sign content determining module stores images that are determined to be the identified traffic sign in an image memory, and uses a template corresponding to the content of the identified traffic sign for each of the plurality of countries to determine conclusively determines the one country which has the highest correlation, during an idle time of the processing that uses the templates for the one certain country which respectively correspond to the contents of the traffic signs and determines the one content which has the highest correlation with the content of the identified traffic sign.

* * * * *